US010560265B2

(12) United States Patent
Zhao et al.

(10) Patent No.: US 10,560,265 B2
(45) Date of Patent: *Feb. 11, 2020

(54) MOBILE SECRET COMMUNICATIONS METHOD BASED ON QUANTUM KEY DISTRIBUTION NETWORK

(71) Applicants: QUANTUMCTEK CO., LTD., Hefei, Anhui (CN); Shandong Institute of Quantum Science and Technology Co., Ltd., Jinan, Shandong (CN)

(72) Inventors: Yong Zhao, Jinan (CN); Chunhua Liu, Jinan (CN)

(73) Assignees: QUANTUMCTEK CO., LTD., Hefei (CN); Shandong Institute of Quantum Science and Technology Co., Ltd., Jinan (CN)

( * ) Notice: Subject to any disclaimer, the term of this patent is extended or adjusted under 35 U.S.C. 154(b) by 308 days.

This patent is subject to a terminal disclaimer.

(21) Appl. No.: 15/481,927

(22) Filed: Apr. 7, 2017

(65) Prior Publication Data
US 2017/0214525 A1    Jul. 27, 2017

Related U.S. Application Data

(63) Continuation-in-part of application No. 14/896,237, filed as application No. PCT/CN2014/079380 on Jun. 6, 2014, now Pat. No. 9,654,287.

(30) Foreign Application Priority Data

Jun. 8, 2013    (CN) .......................... 2013 1 0228383

(51) Int. Cl.
*H04L 9/32*    (2006.01)
*H04L 9/08*    (2006.01)
(Continued)

(52) U.S. Cl.
CPC .......... *H04L 9/0855* (2013.01); *H04L 9/0822* (2013.01); *H04L 63/083* (2013.01);
(Continued)

(58) Field of Classification Search
USPC ....................................................... 713/171
See application file for complete search history.

(56) References Cited

U.S. PATENT DOCUMENTS

2011/0243331 A1* 10/2011 Yasuda ................ H04L 9/0662
380/279

* cited by examiner

*Primary Examiner* — Jeffrey C Pwu
*Assistant Examiner* — Samuel Ambaye
(74) *Attorney, Agent, or Firm* — Maschoff Brennan

(57) ABSTRACT

A mobile secret communications method based on a quantum key distribution network, comprises the following steps: a mobile terminal registering to access the network and establishing a binding relationship with a certain centralized control station in the quantum key distribution network; after a communication service is initiated, the mobile terminals participating in the current communication applying for service keys from the quantum key distribution network; the quantum key distribution network obtaining addresses of the centralized control stations participating in service key distribution during the current communication, designating a service key generation centralized control station according to a current state indicator of each centralized control station; the service key generation centralized control station generating service keys required in the current communication and distributing the keys to the mobile terminals participating in the current communication.

20 Claims, 8 Drawing Sheets

(51) Int. Cl.
*H04W 12/04* (2009.01)
*H04W 12/06* (2009.01)
*H04L 29/06* (2006.01)

(52) U.S. Cl.
CPC ............ *H04W 12/04* (2013.01); *H04W 12/06* (2013.01); *H04L 2209/80* (2013.01)

MOBILE SECRET COMMUNICATIONS METHOD BASED ON QUANTUM KEY DISTRIBUTION NETWORK

The present application is a continuation-in-part of U.S. patent application Ser. No. 14/896,237, filed on Dec. 4, 2015, which is a national phase of International Application No. PCT/CN2014/079380 titled "MOBILE SECRET COMMUNICATIONS METHOD BASED ON QUANTUM KEY DISTRIBUTION NETWORK", filed on Jun. 6, 2014, which claims the priority to Chinese Patent Application No. 201310228383.3, titled "MOBILE SECRET COMMUNICATIONS METHOD BASED ON QUANTUM KEY DISTRIBUTION NETWORK", filed on Jun. 8, 2013 with the State Intellectual Property Office of People's Republic of China, which are incorporated herein by reference in their entirety.

TECHNICAL FIELD

The disclosure relates to the field of mobile communication encryption, and in particular to a mobile secure communication method based on a quantum key distribution network.

BACKGROUND

A modern cryptography system is mainly based on unidirectivity of computation, of which security is achieved only through experience; a future quantum computer makes fast prime factorization algorithm possible, thus foundations of the conventional cryptosystem are no longer required. The quantum key distribution technology is a new means of communication encryption emerging in recent years, which uses the single-photon quantum states encoding information to distribute a same string of random numbers of arbitrary length between a quantum signal transmitter and a quantum signal receiver located at different places, i.e., both sharing a large number of random keys. The random keys can be used to encrypt information to be transmitted between the two places. Due to the indivisibility of a single photon and quantum no-cloning theorem, the quantum key distribution can't be eavesdropped according to physical principles, having the highest level of security at present. If classical information is encrypted and decrypted by OTP (One-Time Pad), unconditional security for information transmission will be guaranteed.

In current technology, taking into account decay of the single photon in an optical-fiber channel and detection efficiency of a detector, it is hard to generate a shared quantum key available for practical secure communication if distance between the two places is beyond a certain scope. Thus, it is required to introduce trusted relay equipment between the two places, which are far away from each other, for quantum secure communication.

According to conventional mobile encryption systems and communication methods based on the quantum key distribution network, a mobile terminal is registered for accessing the network and then is connected to a quantum terminal, and applies to the quantum terminal for shared keys with a certain amount. After downloading the keys, the mobile terminal has a binding relationship with a specific quantum centralized control station, registers with the quantum centralized control station, and uses the quantum centralized control station as a calling centralized control station. When the mobile terminal communicates, the mobile terminal transfers ciphertext to the calling centralized control station. The calling centralized control station re-encrypts the ciphertext and transfers the ciphertext to a called centralized control station. The called centralized control station re-encrypts the ciphertext and transfers the ciphertext to a called user. The called user decrypts the ciphertext for plaintext, and the communication ends.

The technical solution may work well in mobile communication, but there are certain limitations for it is difficult to meet all mobile communication requirements. Ciphertext relay mobile secure communication is adopted in the foregoing technical solution. That is, the ciphertext, i.e., encrypted effective communication information load (plaintext information, such as short message and voice), is transferred among quantum centralized control stations in a quantum secure communication network. The transfer of the ciphertext data stream follows the path 'calling terminal—calling centralized control station—relay centralized control station(s) (number: 0-n)—called centralized control station—called terminal'. This path is different from that of the data stream in some conventional mobile communication services, such as SIP call. During the call, the voice data stream is directly transferred between two mobile terminal devices in the form of point-to-point without flowing through the secure quantum communication network. Another example is SMS short message. The short message sent from the mobile phone is transferred through a proprietary network of telecom operators (China Mobile, China Telecom, China Unicom, etc.), without flowing through the secure quantum communication network either. Thus, for the above mentioned communication services with a proprietary data stream path, the ciphertext relay is a little troublesome. If necessary, the ciphertext relay can be adopted in these services usually by two ways. According to the first way, large-scale modifications are made to a conventional service link and logic, and a quantum security function is introduced. For example, if the SMS short message needs to be encrypted through the ciphertext relay, the network of telecom operators has to be changed to include quantum devices matching the nodes in the networks of China Mobile or China Unicom when the short message follows through the nodes, which complicates the whole system drastically and increases development and configuration costs. According to the second way, the conventional service link is abandoned, and a proprietary service link is established in the quantum secure network. The foregoing SMS is still taken as an example. The short message sent by the mobile phone is transferred to the quantum secure network wirelessly, without passing through the networks of telecom operators, and then is sent to a receiver through ciphertext relay. In this way, mobile terminals need to be customized, and communication services need to be realized in the quantum secure network (for example, in order to receive and send short messages in the ciphertext relay mobile secure communication scheme, it is required to provide a short message server in the quantum secure network first, and then modify the mobile terminal. Thus the short message is directly sent to the proprietary short message server without passing through networks of telecom operators). The cost is high, realization is complicated, and products are not compatible with conventional networks of telecom operators, which is disadvantageous for promotion.

In addition, characteristics of the ciphertext relay mobile secure communication determine the following content: only when a specific service between two communicating parties is truly established, and the plaintext required to be transferred is generated, encryption and transfer may be started. If there are too many relay nodes in the transferring path and the transfer takes long time, service delay is bound to be increased. For communication services with a high real-time requirement (such as SIP voice call, video call, etc.), user experience may be poor.

Hence, key relay mobile secure communication is adopted in the disclosure to solve the above problems. That is, the data relayed between centralized control stations is the service keys required by the communication instead of the ciphertext. Due to the characteristics of the quantum key, the generation of a shared quantum key is limited by the distance between two places. Thus new trusted relay devices need to be provided between the two places to relay the practical communication service keys if a quantum key distribution network with specific physical coverage is to be built. In some communication services with high real-time requirement, even if the key relay mobile secure communication is adopted, there could be a problem of delayed arrival of the keys caused by a large number of concurrent calls and relay nodes and long time consumed in the generation and relay of the service keys, which lowers the quality of service.

SUMMARY

In view of this, a mobile secure communication method based on a quantum key distribution network is provided. An improved solution for key relay mobile secure communication is adopted, which can meet some of mobile communication service requirements for which the technology of ciphertext relay mobile secure communication is not convenient in practice. Improvement is also made to current solutions in terms of service key generation and key relay, and quality issues caused by delayed arrival of the keys when there are lots of concurrent communication services and relay nodes are improved.

To achieve the above objective, the following technical solution is adopted.

A mobile secure communication method based on a quantum key distribution network is provided, including:

(1) registering mobile terminals to access the network and obtain unique quantum identity numbers;

(2) establishing a binding relationship and sharing keys between each mobile terminal and a centralized control station in the quantum key distribution network;

(3) after a communication service is initiated, sending respectively, by a calling mobile terminal and a called mobile terminal, a service information packet and a called-party response information packet to a quantum network management server in the quantum key distribution network, to apply for service keys for the communication;

(4) obtaining, by the quantum key distribution network, addresses of a calling centralized control station, a called centralized control station, and centralized control stations participating in relaying the service keys in the communication;

(5) collecting, by the quantum key distribution network, current state indicators of centralized control stations participating in distributing the service keys in the communication to designate a centralized control station for service key generation in the communication, send the service information packet to the centralized control station for service key generation, and command the centralized control station for service key generation to generate the service keys required by the communication;

(6) generating and encrypting, by the centralized control station for service key generation, the service keys required by the communication, and distributing, by the centralized control station for service key generation, the encrypted service keys to the mobile terminals participating in the communication;

(7) obtaining and decrypting, by the mobile terminals, the encrypted service keys distributed by a centralized control station(s) bound to the mobile terminals, wherein the mobile terminals decrypt the encrypted service keys through the keys shared with the centralized control station(s) bound to the mobile terminals, to obtain the service keys for the communication;

(8) performing, by the mobile terminals participating in the communication, secure communication with the service keys through an original data link of the communication service.

The 'binding relationship' in the step (2) is characterized by:

(2-1) a mobile terminal which has already been registered to access the network has a unique quantum identity number in the quantum key distribution network;

(2-2) one mobile terminal cannot be bound to a plurality of centralized control stations during the same period;

(2-3) it is allowed to bind zero, one or more mobile terminals to one centralized control station during the same period;

(2-4) the binding relationship between mobile terminals and centralized control stations is stored in the quantum network management server in the quantum key distribution network;

(2-5) a mobile terminal and a centralized control station bound to the mobile terminal share keys.

In the step (4), the quantum key distribution network obtaining addresses of centralized control stations participating in distributing the service keys in the communication includes:

the quantum network management server obtaining the addresses of the calling centralized control station and the called centralized control station in the communication, based on information related to the calling mobile terminal and the called mobile terminal in the received information packets and the binding relationship between the centralized control station and the mobile terminal; and querying a stored relay routing table for the service keys, and obtaining the addresses of relay centralized control stations between the calling centralized control station and the called centralized control station in the communication.

In the step (5), the quantum key distribution network designating the centralized control station for service key generation in the communication, and commanding the centralized control station for service key generation to generate the service keys required by the communication includes:

(5-1) the quantum network management server sending an instruction to the calling centralized control station, the called centralized control station, and the relay centralized control stations between the calling centralized control station and the called centralized control station, which are related to the communication, to command the centralized control stations to upload respective current state indicators to the quantum network management server;

(5-2) the quantum network management server collecting the current state indicators of the centralized control stations, and designating the centralized control station for service key generation in the communication based on the current state indicators;

(5-3) the quantum network management server adding the addresses of the calling centralized control station and the called centralized control station in the communication into the service information packet sent from the calling mobile terminal, making a copy of the service information packet, designating, in the two service information packets, the calling centralized control station and the called centralized control station as the target centralized control station respectively, and sending the two service information packets to the centralized control station for service key generation in the communication, to command the centralized control station for service key generation to generate the service keys required by the communication.

In the step (5), the current state indicators of the centralized control stations include:

<1> an indicator reflecting a heavy state for service key generation tasks which the centralized control station is currently burdened with, wherein the indicator is a quantitative indicator and includes:

<1-1> a rated service key generation rate of the centralized control station;

<1-2> the number of groups of the secure communication services for which the centralized control station is currently generating service keys;

<1-3> an amount of service keys to be generated currently by the centralized control station;

<1-4> an actual generation rate and a consumption rate of each of the groups of service keys which are designated to be generated by the centralized control station;

<1-5> an amount of service keys which are generated and an amount of service keys which are consumed, for each of the groups of the service keys which are designated to be generated by the centralized control station;

<2> an indicator reflecting a current location state of the centralized control station in the quantum key distribution network, wherein the indicator is a quantitative indicator and comprises:

<2-1> the number of other centralized control stations with which the centralized control station shares quantum channels, thus shared keys may be generated;

<2-2> the number of hops between the centralized control station and other centralized control stations;

<3> any combination of one or more items among the above seven state indicators.

Further, in the step (6), the centralized control station for service key generation distributing the encrypted service keys to the mobile terminals participating in the communication includes:

(6-1) the centralized control station for service key generation respectively analyzing content of the two service information packets sent by the quantum network management server, if the target centralized control station designated in the service information packet is the centralized control station itself, encrypting the service keys with the keys shared between the centralized control station and the calling mobile terminal or the called mobile terminal participating in the communication, and then sending the encrypted service keys to the calling mobile terminal or the called mobile terminal; if the target centralized control station designated in the service information packet is not the centralized control station itself, searching in a relay routing table for the service keys for a next hop centralized control station leading to the target centralized control station, encrypting the service keys for the communication with the keys shared with the next hop centralized control station, and then sending the encrypted service keys along with the service information packet to the next hop centralized control station;

(6-2) after receiving the encrypted service keys and the service information packet relayed from a last hop centralized control station, a centralized control station decrypting the received service keys with the keys shared with the last hop centralized control station at first, and then performing processes according to (6-1).

In the step (6-1) and (6-2), the centralized control station receiving the service keys relayed from the last hop centralized control station, and then sending the service keys to the next hop centralized control station or a mobile terminal, is characterized by: the centralized control station starts encrypting and forwarding the service keys at the beginning of receiving and decrypting a first frame data of the service keys, rather than after completely receiving the service keys for the communication from the last hop centralized control station; or a threshold is set, and once an amount of decrypted service keys is greater than the threshold, the centralized control station starts encrypting and forwarding the service keys; a dynamic upper limit of the amount of encrypted and forwarded service keys is the amount of service keys received and decrypted currently; and during the same period, the service keys for the communication are in a state of concurrent relaying among a plurality of centralized control stations.

The relay routing table for the service keys consists of records, and each record comprises: [address of local station] [address of target] [address of next hop]; a respective relay routing table for the service keys is stored in each of the centralized control stations in the quantum key distribution network; current relay routing tables for the service keys for centralized control stations are stored in the quantum network management server; the relay routing table for the service keys is updated with changes of a topology of the quantum key distribution network.

Main functions of the quantum network management server include: storing, maintaining and querying the 'binding relationship' between centralized control stations and mobile terminals, and the 'relay routing table for the service keys'; distributing a unique quantum identity number in the network to a mobile terminal which is newly registered to access the network; maintaining classic network connections to centralized control stations; determining legality of a mobile terminal based on received information associated with the mobile terminal; collecting current state indicators of centralized control stations participating in service key distribution, determining and designating the centralized control station for service key generation, and generating and sending new service information packets to the centralized control station; querying addresses of centralized control stations located in a region where the mobile terminal is located, according to a geographic location of the mobile terminal; communicating with centralized control stations, and sending instructions to the centralized control stations.

Preferably, when the quantum key distribution network distributes service keys for a non-real-time non-bidirectional interactive communication service:

<1> after receiving an application for the service keys from the calling mobile terminal, the quantum key distribution network directly designates the centralized control station for service key generation for the communication instead of collecting the current state indicators of the centralized control stations, commands the centralized control station for service key generation to generate the service keys required by the communication, distributes the service keys to the calling mobile terminal, and relays the service keys to the called centralized control station; the calling mobile terminal encrypts plaintext with the service keys to obtain ciphertext and sends the ciphertext to the called mobile terminal, and the called mobile terminal applies to the quantum key distribution network for the service keys and downloads the service keys from the called centralized control station after receiving the ciphertext;

<2> the quantum key distribution network retains the service information packet sent from the calling mobile terminal for a period of time, matches the service information packet with a called-party response information packet sent from the called mobile terminal, in order to distribute to the called mobile terminal the service keys which are the same as the ones distributed to the calling mobile terminal; a threshold time is set for the period, and if the called-party response information packet is not received when the threshold time is reached, the quantum key distribution network destroys the service keys generated for the communication.

Preferably, when geographic location of a mobile terminal changes, the binding relationship is established between the mobile terminal and a centralized control station currently located in a region where the mobile terminal is located; and the keys shared between the mobile terminal and an original centralized control station bound to the mobile terminal are transferred to a new centralized control station bound to the mobile terminal after being encrypted, the new centralized control station bound to the mobile terminal shares the keys with the mobile terminal after decrypting the keys.

Beneficial effects of the disclosure:

(1) Through the calling mobile terminal-centralized control stations in the quantum key distribution network—the called mobile terminal, what are transferred are not the ciphertext of encrypted service information, but are the encrypted service keys. The ciphertext are still transferred through an original data link of a specific service, and arrive at the mobile terminal through a path different from that for the keys, and the encryption and decryption for the service information are only performed once at the mobile terminal. This is referred to as key relay mobile secure communication, with better compatibility with existing communication services. It is only required to connect the data flow transmission path for the original mobile communication service to a new quantum key distribution network, without changing the data flow transmission path, and application scope of the quantum secure network is extended. Implementation is relatively easier, modification cost is low, and construction period is short.

(2) For communication services with high real-time requirement, such as voice call service, improved quality of calling and reduced delay can be achieved. An SIP call is taken as example:

After the calling end dials, the called end receives the call and begins to ring. From the beginning of ringing because of reception of the call to the moment the called end presses the answer key, there is an interval of several seconds, and this interval can be used to transfer and download the service keys required by the communication. When the call is completely established, parts of the service keys have been already downloaded, and may even have been downloaded completely. This cannot be achieved in the ciphertext relay mobile secure communication, where voice plaintext may be encrypted only after the voice call between two parties begins and the voice plaintext are generated, and then the relay transmission begins stage by stage; in this way, time consumed for each frame of real-time voice data to transfer between the calling mobile terminal and the called mobile terminal in the communication is an accumulation of delay for the relay transmission (including encryption and decryption in each centralized control station) among centralized control stations. In the key relay mobile secure communication, both parties of the communication already have the service keys (at least parts of the service keys), thus voice data plaintext can arrive at the destination through the original service path with only one round of transmission, encryption and decryption. The delay is greatly shortened, and the greater the number of relay centralized control stations is, the more obvious the comparative advantages are. Further, the ciphertext relay mobile secure communication faces the issue of delay caused by encrypting and decrypting stage by stage during the whole communication rather than only at the beginning of the communication. While in the key relay mobile secure communication, the service keys can be downloaded to the mobile terminal (either downloaded for the first time or downloaded for continuation during the communication) before being used, thus effective communication information is always transferred between the calling mobile terminal and the called mobile terminal in the communication directly, and is only encrypted and decrypted once.

(3) In one communication, choosing which centralized control station in the link as the centralized control station for service key generation for the communication directly relates to the quality of service, especially when there is a large amount of concurrent communications and great pressure on the service key generation in the entire network. Taking full account of real-time states of current service key generation and location states for centralized control stations in the communication link, the most suitable one is chosen as the centralized control station for service key generation for the communication, which is advantageous for reducing the delay caused by the service key generation and transmission, improving key relay efficiency of the quantum key distribution network, and enhancing the quality of service.

(4) When the geographic location of the mobile terminal changes, the quantum key distribution network can dynamically allocate the centralized control station bound to the mobile terminal, which allows the mobile terminal to obtain service keys from a nearby centralized control station, and adapts to characteristics of the mobile communication.

DETAILED DESCRIPTION OF THE EMBODIMENTS

Figure 1A:
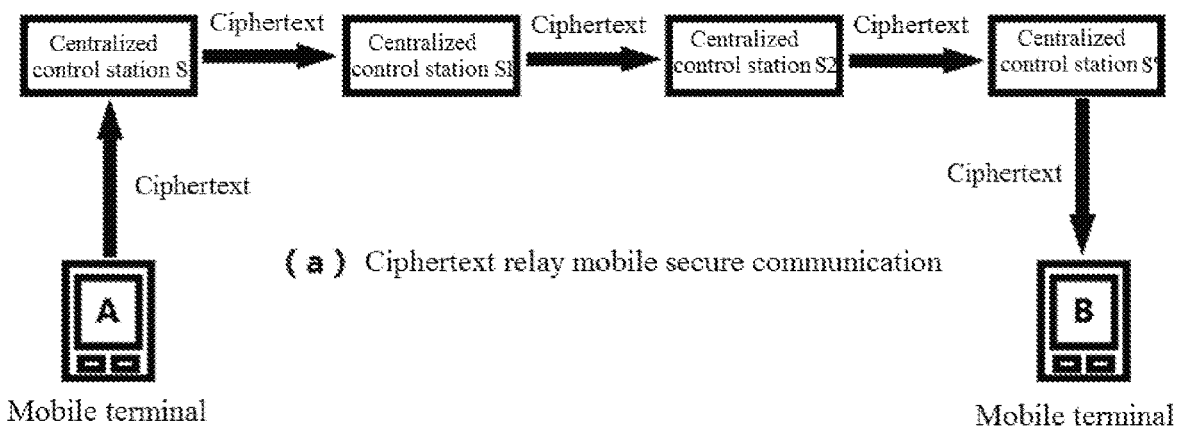
FIG. 1(a) and FIG. 1(b) are diagrams for comparing ciphertext relay mobile secure communication with key relay mobile secure communication.

The disclosure is to be described in conjunction with drawings and embodiments hereinafter.

Main hardware devices related to a mobile secure communication method based on a quantum key distribution network include: ①  a mobile terminal, which may be a smart phone, tablet computer, set-top box, notebook computer, PDA or other mobile devices, and is an initiator or a recipient of communication service. The mobile terminal includes: a permanent storage device, such as flash memory chip, to store the downloaded keys shared with a centralized control station; a temporary storage device, such as memory, to store the downloaded service keys; a hardware module with a capability of supporting network access, which is capable to send or receive data through conventional uplink or downlink network channel (including various wireless networks); and a processor with enough computing power, capable of encrypting and decrypting service information. The mobile terminal should have a capability of exchanging information with the quantum key distribution network. ② a quantum centralized control station (also referred to as centralized control station), which is a major part of the quantum key distribution network, and consists of optical matrix switch, quantum key transceiver, true random number generator, quantum communication server, etc. The quantum centralized control station can generate shared keys with other centralized control stations and quantum terminals. The quantum device or the true random number generator can generate the service keys required by the communication. The generated keys are stored in the quantum communication server. The major role of the quantum centralized control station is to manage the generation, storage and relay of the keys, make statistics of various state indicators of the quantum centralized control station, and interact with a quantum network management server. ③ a quantum terminal. The centralized control stations have a large volume, and the number of them is limited within a certain region. Thus a certain number of quantum terminals are required as an extension of the centralized control station in most cases. The quantum terminal includes a key temporal unit, a quantum key transmitter and/or a quantum key receiver, etc. A plurality of quantum terminals can be connected to one centralized control station. Each quantum terminal can generate the shared quantum keys with the connected centralized control station. The mobile terminal can choose a nearby quantum terminal for connection to accomplish operations such as registration for accessing the network, and downloading the keys shared with the centralized control station. ④ a quantum network management server, which is a computer server installed with a quantum key distribution network management program, and is in a 'housekeeper' role in the quantum key distribution network. The quantum network management server has classic network connections with each centralized control station, and can collect in real time various state information of respective centralized control stations for computation and give corresponding instructions to the respective centralized control stations.

The keys according to the disclosure mainly include: ① the keys shared between the centralized control stations, which are generated by the quantum key distribution devices among the centralized control stations and are stored in the centralized control stations. ② the shared keys between the centralized control station and the mobile terminal, which are generated by the quantum key distribution devices among the centralized control stations and quantum terminals, and can be downloaded by the mobile terminal to a local permanent storage device in a wired way. The shared keys are also stored in the centralized control station. ③ the service keys required by each communication, which are generated by a centralized control station for service key generation for each communication. Based on secrecy levels and application scenarios, the service keys may be generated by the quantum devices, or may be generated by the true random number generator. The service keys are downloaded to the temporary storage device (such as the memory) of the mobile terminal for each communication, and are discarded if they are used or discarded when the communication is completed regardless whether the service keys are used.

Figure 1B:
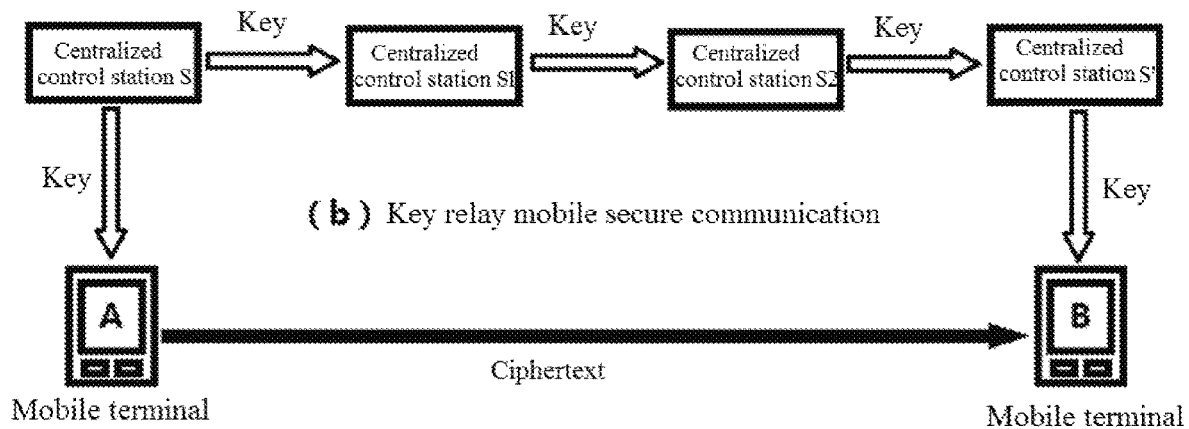

Different from the ciphertext relay mobile secure communication, the key relay mobile secure communication is adopted in the disclosure. The case that a calling mobile terminal sends a message to a called mobile terminal is taken as an example, and the differences between the two methods are shown in FIG. 1. To put it simply, in the former solution (as shown in FIG. 1(a)), after plaintext being encrypted by the calling mobile terminal A, ciphertext is sent to a calling centralized control station S, then is sent to the called mobile terminal B stage by stage where it is decrypted; in the latter solution, after being encrypted by a centralized control station (in the example shown in FIG. 1(b), the calling centralized control station S serves as the centralized control station for service key generation) in the link, the service key is sent to two mobile terminals A and B stage by stage, the mobile terminal A encrypts the plaintext with the service key and sends the ciphertext to the mobile terminal B which will decrypt the ciphertext.

Figure 2:
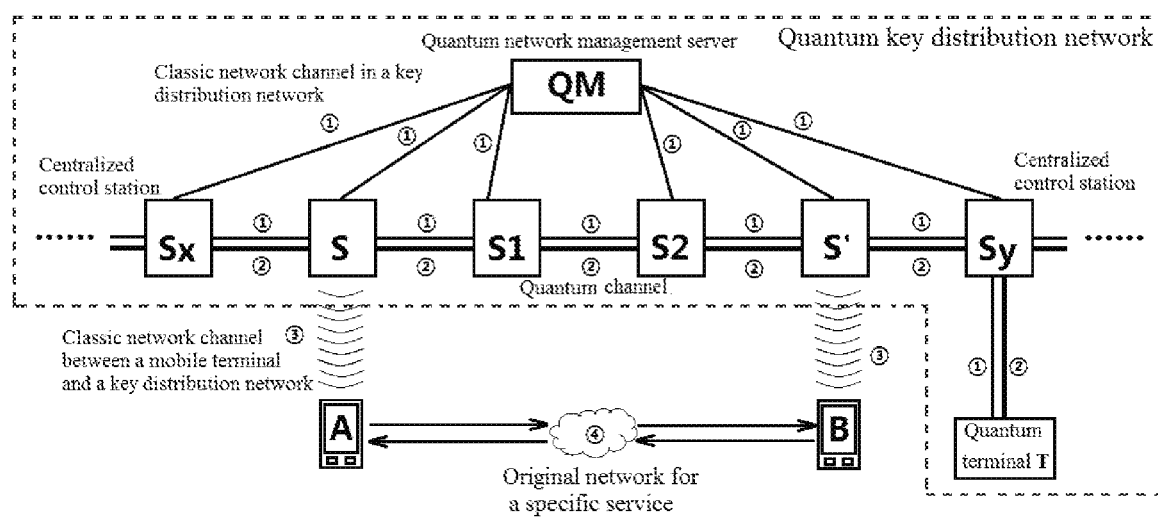
FIG. 2 is a diagram showing various communication channels in a quantum key distribution network.

In the solution of the disclosure, there is a plurality of connection channels between hardware devices, as shown in FIG. 2. The channel between the quantum network management server and the centralized control station is the classic network channel (can be wireless network or wired network connection), of which the major role is to transfer real-time data and control information between the quantum network management server and the centralized control station. Both classic network channels and quantum channels exist between centralized control stations within the quantum key distribution network, as well as between the centralized control station and the quantum terminal. The classic network can be wired or wireless network, and the quantum channel can be a fiber channel, a quantum channel in free space, etc. The quantum channel is configured to generate the quantum keys, with the aid of the classic channel to transfer some negotiation information. At the same time, the classic channel is also responsible for tasks such as key relay between centralized control stations. Information is transferred between a mobile terminal in a free-moving state and a binding centralized control station within the quantum key distribution network through the classic network, especially through the classic wireless network technology, such as Wi-Fi technology or 3G technology. Service communication between two mobile terminals still adopts the conventional data link, e.g. SMS short message, the data stream of which flows through the conventional short message link of telecom operators; however the content of the short message is encrypted.

The foregoing classic network channel can be a direct point-to-point physical connection between two devices, or can be a logic connection established by connecting the two devices to a classic network.

Figure 3:
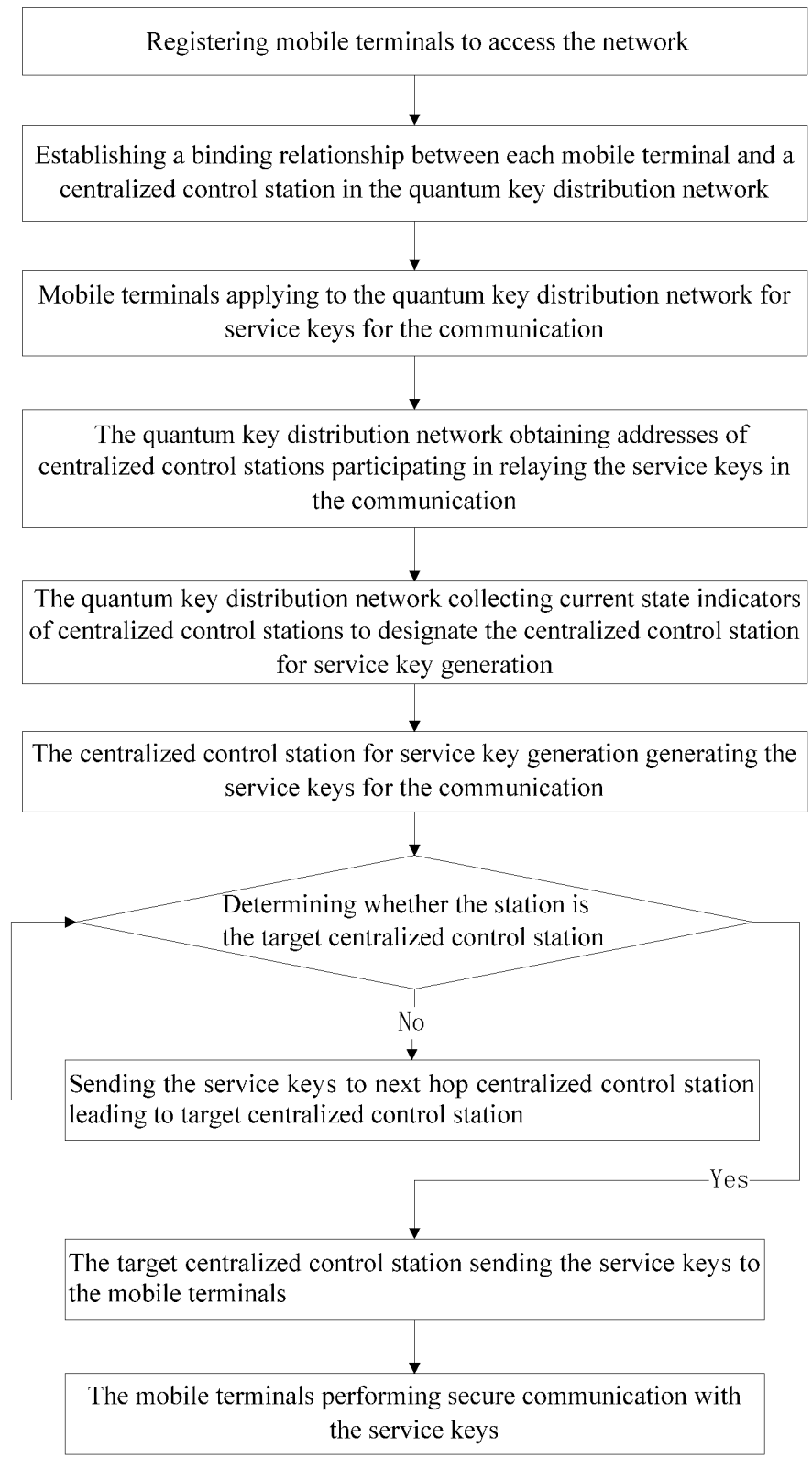
FIG. 3 is a flow chart of a mobile secure communication.

The process from initial registration of the mobile terminal for accessing the network to accomplishment of a secure communication between two mobile terminals implementing the method is taken as example, to illustrate the specific implementation of the disclosure. The overall flow is shown in FIG. 3.

In Step1, mobile terminals are registered to access a network and obtain unique quantum identity numbers.

A mobile terminal holder (can be an individual, or a manufacturer of the mobile device) first should go through formalities related to accessing a secure communication network (referred to as accessing the network hereinafter) in a quantum secure authentication center, and the quantum secure authentication center is responsible for manually reviewing a user application for accessing the network. If it is approved, a quantum identity number, which is unique in the network, is assigned by a quantum network management server to the mobile terminal applying for accessing the network. The quantum identity number is stored in a permanent storage medium (such as a SD card or a flash memory of the terminal) in the mobile terminal applying for accessing the network. A password is set for authentication when connecting to a quantum terminal. While assigning the quantum identity number, the quantum network management server also adds a new record to a native table of binding relationship between centralized control stations and mobile terminals, and writes the quantum identity number and password to the new record. In general, a mobile terminal only needs to apply for accessing the network once, and can use the network after approval of the application for accessing the network.

In Step2, the binding relationship is established between each mobile terminal and a centralized control station in the quantum key distribution network, and the mobile terminal shares keys with the centralized control station.

Figure 4:
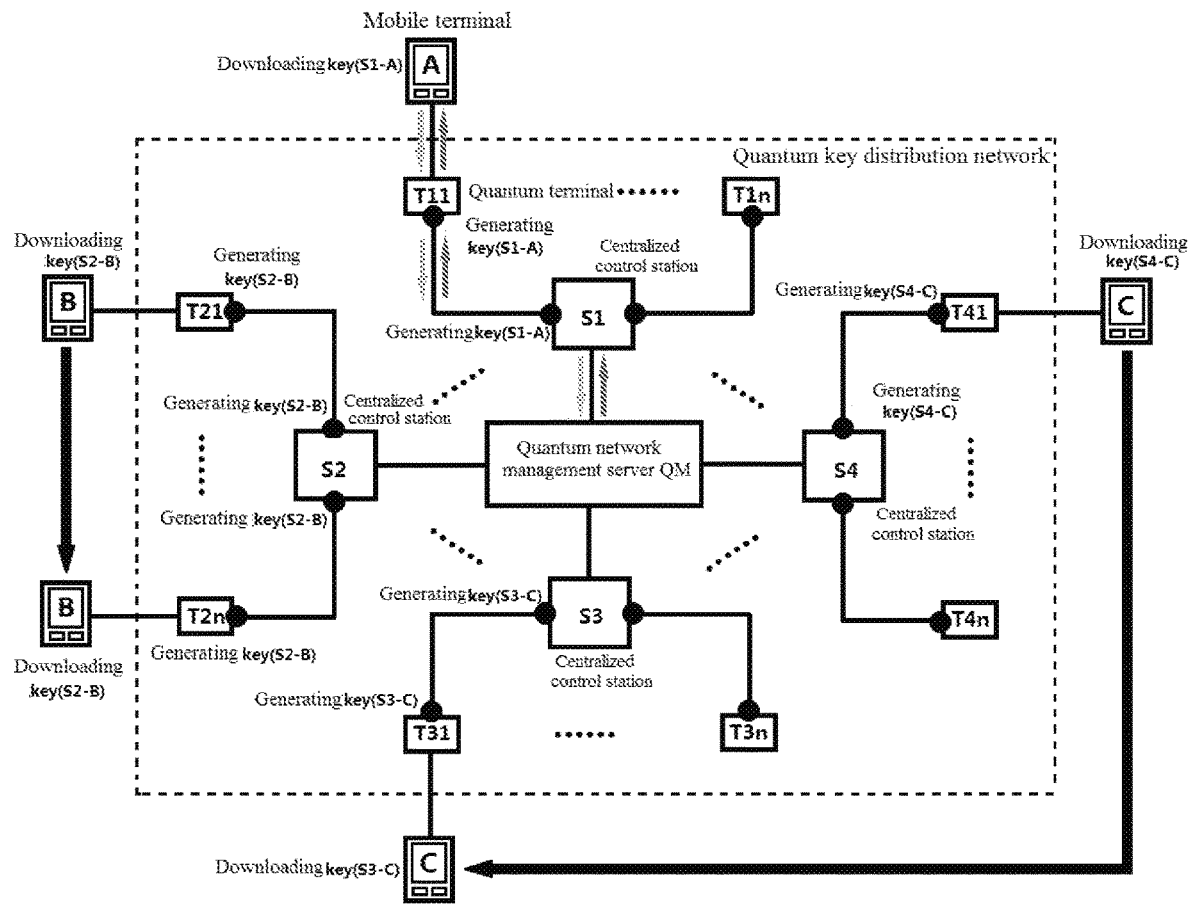
FIG. 4 is a diagram illustrating that a mobile terminal applies to a quantum key distribution network for registration for accessing the network.

As shown in FIG. 4, mobile terminal A chooses an arbitrary quantum terminal T11 in the quantum key distribution network, and is connected to the quantum terminal T11 in a reliable wired mode (such as USB data cable connection). The authentication password is to be input when prompted. The quantum identity number QID-A (this item is null if the mobile terminal has not accessed the network yet) and authentication password of the mobile terminal A, as well as accounts of the communication services requiring encryption-protection of the mobile terminal A are sent to the quantum terminal T11, and the quantum terminal T11 sends these information to the centralized control station S1 to which the quantum terminal belongs. Then the centralized control station S1 forwards the information along with an address of the centralized control station S1 to the quantum network management server QM. The quantum network management server QM performs searching in the natively stored table of binding relationship between centralized control stations and mobile terminals, and the searching result may include the following four cases.

<1> If it fails to find the quantum identity number QID-A uploaded by the mobile terminal A in the table, or the uploaded quantum identity number is null, or the quantum identity number does not correspond to the authentication password, it concludes that the connection is illegal and fails to pass the system authentication. Possible reasons include: the quantum identity number QID-A of the mobile terminal A is forged or deregistered; the mobile terminal A has not yet gone through formalities in the authentication center for obtaining the quantum identity number; the current holder of the mobile terminal A is not a legal holder of the mobile terminal, etc. In these cases, the quantum terminal T11 sends information prompt for illegal connection to the mobile terminal A, and breaks the logic connection with the mobile terminal A.

<2> If the system authentication for connection is passed, but the record, corresponding to the quantum identity number QID-A, in the table of binding relationship between centralized control stations and mobile terminals in the quantum network management server QM has only two items: the quantum identity number and the authentication password, it concludes that the mobile terminal just went through formalities in the authentication center and has not yet been bound to any centralized control station. The quantum network management server QM writes the received address S1 of the centralized control station (for convenience, the address S1 of the centralized control station and the centralized control station S1 are both referred to as S1, and description of other centralized control stations is similar) and the accounts of the communication services uploaded by the mobile terminal A to the record corresponding to the quantum identity number QID-A in the table of binding relationship between centralized control stations and mobile terminals. After obtaining the address S1 of the centralized control station, the mobile terminal A stores the address S1 in the permanent storage medium of the mobile terminal A, and takes the centralized control station S1 as its binding centralized control station, thus binding between the mobile terminal A and the centralized control station S1 is achieved.

The same shared keys key(S1-A) are generated through a quantum key distribution mechanism between the centralized control station S1 and the quantum terminal T11. The mobile terminal A downloads the shared keys through a reliable wired connection to the quantum terminal T11, and stores the shared keys in the permanent storage medium of the mobile terminal A, thus the mobile terminal A and its binding centralized control station S1 have the same shared keys. After the downloading, the mobile terminal A breaks the wired connection to the quantum terminal T11, and recovers to a state of free movement.

<3> The system authentication for connection is passed, and the address of binding centralized control station corresponding to the quantum identity number is the same as the received address of the centralized control station. This often happens when the remaining shared keys between the mobile terminal and the centralized control station bound to the mobile terminal are few, and the mobile terminal re-establishes wired connection to a quantum terminal belonging to the centralized control station bound to the mobile terminal, attempting to add keys shared with the centralized control station bound to the mobile terminal. For example, the mobile terminal B as shown in FIG. 4 has downloaded the keys shared with S2 through quantum terminal T21 previously, and now it may download the keys shared with S2 through quantum terminal T2$n$. On this occasion, the shared keys key(S2-B) between the centralized control station S2 and the quantum terminal T2$n$ are generated through the quantum key distribution mechanism, and the mobile terminal B downloads the shared keys via the reliable wired connection with the quantum terminal T2$n$ and stores the shared keys in the permanent storage medium of the mobile terminal B. After the downloading, the mobile terminal B breaks the wired connection to the quantum terminal T2$n$, and recovers to a state of free movement. When using the keys, the previous remaining shared keys are consumed first, and then the shared keys downloaded lately are consumed.

<4> If the mobile terminal C as shown in FIG. 4, passes the system authentication for connection, but the address S4 of the binding centralized control station corresponding to the quantum identity number is different from the received address S3 of centralized control station, it concludes that the mobile terminal C is connected to a quantum terminal belonging to the centralized control station S3 not bound to the mobile terminal. The quantum network management server QM sends a prompt through the link of centralized control station S3—quantum terminal T31—mobile terminal C, to inquire whether to change the binding centralized control station for the mobile terminal C. If the holder of the mobile terminal C agrees with the change, the quantum network management server QM changes the record related to the quantum identity number QID-C in the table of binding relationship between centralized control stations and mobile terminals, i.e., changes the address of the binding centralized control station in the record from S4 to the received address S3 of centralized control station, thus the binding between the mobile terminal C and the address S3 of the new centralized control station is achieved, and a message is sent to the address S4 of the original binding centralized control station, instructing S4 to discard the keys shared with the mobile terminal C. The quantum network management server QM sends the address S3 of the new binding centralized control station to the mobile terminal C, and the mobile terminal C uses the address S3 of the new binding centralized control station to overwrite previously locally stored address S4 of the original binding centralized control station after reception of the address S3, and adopts the centralized control station S3 as the binding centralized control station. The shared keys key(S3-C) between the new binding centralized control station S3 and the quantum terminal T31 are generated through the quantum key distribution mechanism, and the mobile terminal C downloads the shared keys via the reliable wired connection with the quantum terminal T31 and stores the shared keys in the permanent storage medium of the mobile terminal C. Thus, the mobile terminal C and the new binding centralized control station S3 have the same shared keys key(S3-C). If there are some remaining keys shared with the original binding centralized control station S4 stored within the mobile terminal C, the remaining shared keys are discarded. After the downloading, the mobile terminal C breaks the wired connection with the quantum terminal T31, and recovers to the state of free movement.

Figure 5:
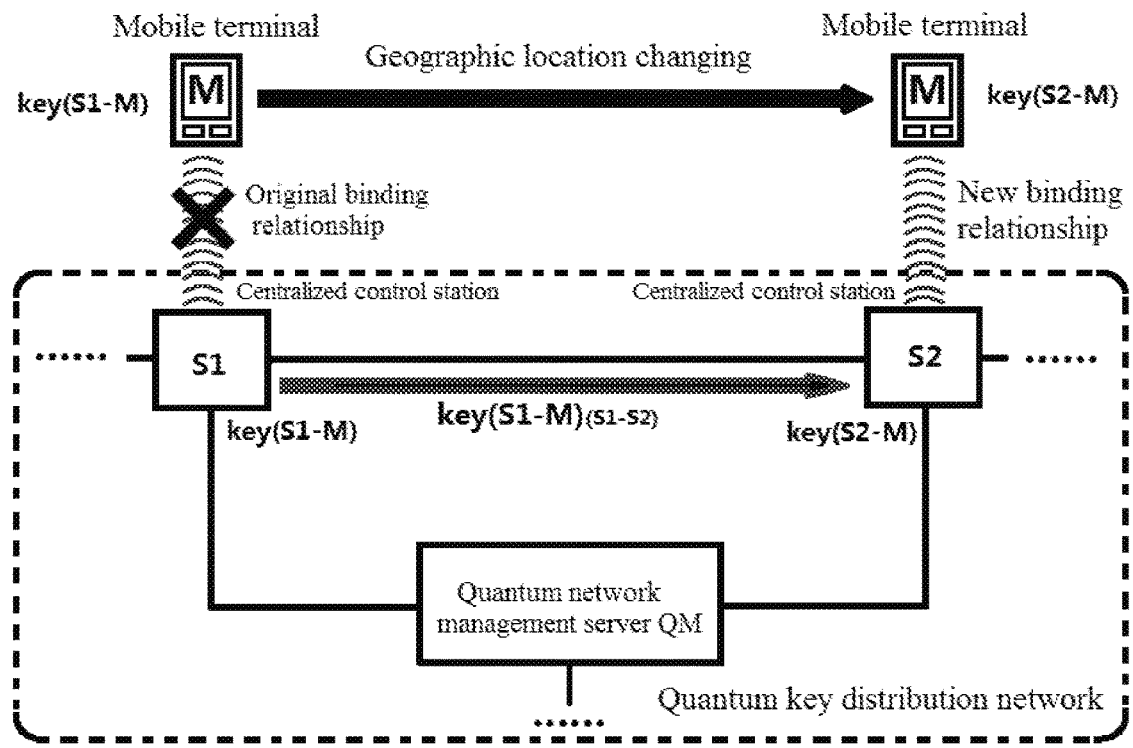
FIG. 5 is a diagram illustrating switching a bound centralized control station when geographic location of the mobile terminal changes.

In the case <4> of Step2, a solution of switching binding centralized control stations through the wired connection when geographic location of a mobile terminal changes is described. Besides, the centralized control station bound to the mobile terminal may be switched through wireless connection. As shown in FIG. 5, the geographic location of the mobile terminal M changes from a location where centralized control station S1 is located to a location where centralized control station S2 is located. The quantum key distribution network inquires the holder of mobile terminal M whether to change the binding centralized control station for the mobile terminal M when knowing the change of the geographic location. On this occasion, the holder of mobile terminal M may choose not to change, and the service keys required for each communication of the mobile terminal M must be applied for from the cross-regional binding centralized control station S1, which may cause issues such as delay, expense, and inconveniency. If the holder of mobile terminal M agrees with the change, the quantum network management server QM in the quantum key distribution network searches for, based on the new geographic location of mobile terminal M, the corresponding centralized control station S2 located in a region of the geographic location, and the quantum key distribution network notifies mobile terminal M, so that M uses S2 as the new binding centralized control station. Then, the quantum network management server QM changes the record related to the quantum identity number QID-M in the table of binding relationship between centralized control stations and mobile terminals, i.e., changes the address of the binding centralized control station in the record from the original S1 to S2. Next, the quantum network management server QM instructs the original binding centralized control station S1 of mobile terminal M to encrypt the stored keys key(S1-M) shared between centralized control station S1 and mobile terminal M with the keys key(S1-S2) shared between centralized control station S1 and centralized control station S2, and the encrypted keys key(S1-M) (S1-S2) are relayed to the new binding centralized control station S2; after reception and decryption, the new binding centralized control station S2 has keys key(S2-M) shared with mobile terminal M, which are the same as the keys key(S1-M), and the keys key(S1-M) stored in the original binding centralized control station S1 are no longer used.

There may be a further solution for the relay process of key(S1-M) from S1 to S2, e.g., only parts of the keys (such as in case of short-term business trip) may be chosen to be relayed to the new binding centralized control station, in this case, for the key(S1-M) stored in the original binding centralized control station S1, the parts relayed to S2 can be destroyed, and other parts can be temporarily reserved. In addition, if there are other centralized control stations between S1 and S2, multiple relays are required to relay key(S1-M) from S1 to S2, and a concept of relay with multiple centralized control stations is described in details hereinafter.

In the case <4> of Step2, a similar following method can also be used. The keys shared between mobile terminal C and its original binding centralized control station S4 are relayed to the new binding centralized control station S3, and serve as the keys shared between mobile terminal C and its new binding centralized control station S3 (the shared keys are not generated through the quantum key distribution mechanism between the new binding centralized control station S3 and the quantum terminal T31). The method is as follows: the original centralized control station S4 bound to mobile terminal C encrypts the shared keys key(S4-C) and relays the encrypted keys to the new binding centralized control station S3, thus the new binding centralized control station S3 has keys key(S3-C) shared with mobile terminal C after decryption, which are the same as the previous key(S4-C). In this method, mobile terminal C needs not to update its original local shared keys.

In conclusion, other modifications easy to think of based on the method fall within the protection scope of the disclosure.

In the cases <3> and <4> of Step2, if accounts of communication services in the table of binding relationship between centralized control stations and mobile terminals are inconsistent with the accounts uploaded by the mobile terminal, the holder of the mobile terminal is prompted to determine whether to update account information of communication services to be protected. If it is yes, the accounts of communication services corresponding to the quantum identity number in the table of binding relationship between centralized control stations and mobile terminals in the quantum network management server are updated. In the Step1 and Step2, the 'table of binding relationship between centralized control stations and mobile terminals' is composed of records. Each record represents registration information of a mobile terminal which is already registered for accessing the network, with the format: [quantum identity number of the mobile terminal] [authentication password] [address of the binding centralized control station] [identifiers of service accounts]. The 'identifiers of service accounts' is a collection of accounts of services supported by the mobile terminal and the quantum key distribution network, and may include accounts of one or more different services (e.g., telephone number, SIP account).

An example of the format of the table of binding relationship between centralized control stations and mobile terminals (symbols such as S1 and S2 are used to represent the real network addresses) is as follows.

| quantum identity number of the mobile terminal | authentication password | address of the binding centralized control stations | identifiers of service accounts | |
|---|---|---|---|---|
| | | | telephone number | SIP account |
| QID-A | ********** | S1 | 15012345678 | test@sip.quantum-info.com |
| QID-B | ********** | S2 | 13987654321 | vip@sip.quantum-soft.com |
| ... | ... | ... | ... | ... |

Figure 6:
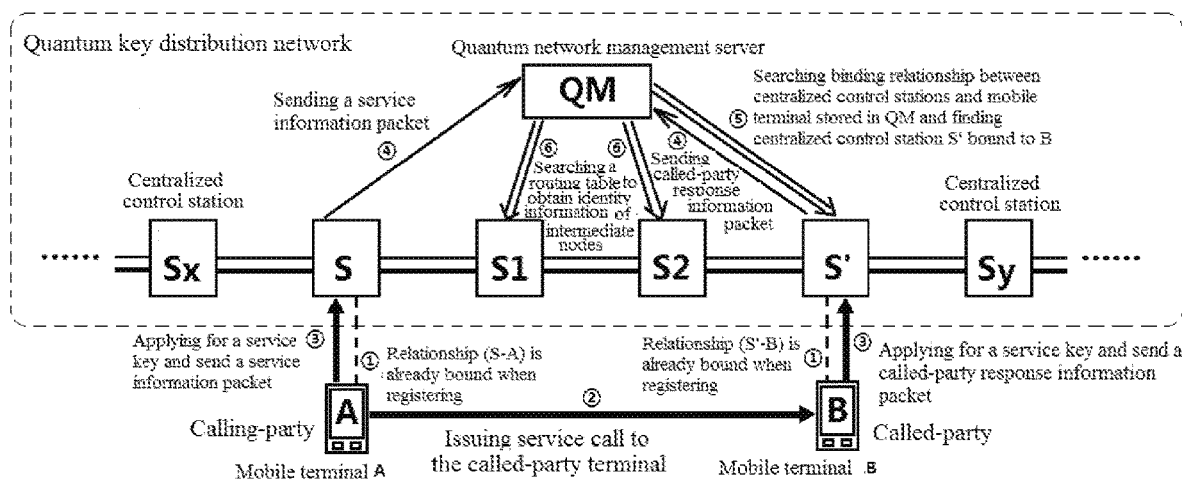
FIG. 6 is a diagram illustrating that the quantum key distribution network determines addresses of centralized control stations participating in distributing service keys during a communication.

Executing processes of Step3-Step4 are shown in FIG. 6.

In Step3, the calling mobile terminal A initiates a normal service call (such as video and SIP call) to the called mobile terminal B, applies to the centralized control station bound to the calling mobile terminal A, i.e., the calling centralized control station S for this communication, for the service keys key(A-B) for this communication, and sends a service information packet of the communication to the calling centralized control station S (the centralized control station has established a thread on the service side, and is waiting for the connection from mobile terminals). The service information packet is generated by the calling mobile terminal, including the quantum identity number and authentication information of the calling mobile terminal A, the communication service account of the called mobile terminal B, service type of the communication, and some parameter information related to the communication (e.g., the thread applies for the service keys for encryption or decryption, and for a video or SIP call, the service information packet needs to include information such as audio and video encoding formats used for the call; for short messages, the service information packet needs to include information such as sequence numbers of ultra-long short messages, and reference values of short messages). After receiving the service call from the calling mobile terminal A, the called mobile terminal B sends a called-party response information packet of the communication to the centralized control station bound to the called mobile terminal B, i.e., to the called centralized control station S' of the communication. The called-party response information packet is generated by the called mobile terminal, including the communication service accounts of the calling mobile terminal A and the called mobile terminal B, the authentication information of the called mobile terminal B, service type of the communication, and some parameter information related to the communication.

In Step4, when receiving the key application, the calling centralized control station S reports to the quantum network management server QM immediately, and sends the received service information packet to QM; similarly, when receiving the key application, the called centralized control station S' reports to the quantum network management server QM immediately, and sends the received called-party response information packet to QM. Based on the quantum identity number QID-A of the calling mobile terminal A in the service information packet, the quantum network management server QM performs searching in the locally stored table of binding relationship between centralized control stations and mobile terminals, and if QID-A is not found in all binding relationship in the table, it concludes that the calling mobile terminal A is currently not a legal mobile terminal for accessing the network (this usually occurs in the case that the quantum key distribution network unilaterally excludes a mobile terminal which has already accessed the network due to some particular reasons, and at the same time, the mobile terminal A still considers S as the centralized control station bound to the mobile terminal A, but the binding relationship is not acknowledged by the quantum key distribution network), thus the quantum network management server QM does not distribute the service keys to the mobile terminal A, and sends a notification message to the centralized control station S (in this case there is no binding relationship between S and A, and just because the key application is sent by A to QM through S, i.e., the communication link has already been established, the notification message is sent to A through the same path for convenience). The centralized control station S notifies the calling mobile terminal A that the communication is not protected, and suggests the calling mobile terminal A terminate the communication and go through the formalities again to obtain a qualification for accessing the network. If the quantum identity number QID-A of the calling mobile terminal A is found in the binding relationship table, and the authentication information is correct, the centralized control station S bound to the mobile terminal A can be obtained through table look-up, which is the calling centralized control station of the communication. Based on the service type and the communication service account of the called mobile terminal B in the service information packet, the quantum network management server QM searches in the locally stored table of binding relationship between centralized control stations and mobile terminals, and if the communication service account of the called mobile terminal B in the service information packet is not found in all binding relationships, it concludes that the called mobile terminal B has not been bound to any centralized control station. The quantum network management server QM does not distribute the service keys to the called mobile terminal B, and sends a notification message to the binding centralized control station S of the calling mobile terminal A. The centralized control station S then notifies the calling mobile terminal A that the called party is not a legal secure mobile terminal, and suggests that the calling mobile terminal A terminate the communication. If the holder of the calling mobile terminal A does not terminate the communication, both parties would hear noise (voice call is taken as example) due to encryption and decryption operations being performed by one party while normal operations being performed by the other party, which does not result in a leak.

Under a normal condition, if the binding relationship has already been established between the mobile terminal B and the centralized control station S' in the quantum key distribution network, QM may preliminarily know that the called centralized control station of the communication is S' by searching in the table of binding relationship between centralized control stations and mobile terminals for the service type and the communication service account of the called mobile terminal B in the service information packet; then QM reviews the received called-party response information packets, searches for a called-party response information packet sent from the called terminal communicating with the calling terminal A, and looks for, in the table of binding relationship between centralized control stations and mobile terminals, the communication service account of the called mobile terminal B identified in the packet. If the communication service account is found and the authentication information is correct, address of the centralized control station S' bound to the mobile terminal B corresponding to the communication service account can be obtained through table-lookup, thus, the centralized control station S' bound to the mobile terminal B communicating with the calling terminal A is eventually determined as the called centralized control station for this communication. QM then calls up, from a routing table library of QM, a current relay routing table for the service keys for the calling centralized control station S, from which QM knows that the next hop centralized control station from S to S' is S1. After that, QM calls up the current relay routing table for the service keys for S1, from which QM knows that the next hop centralized control station from S1 to S' is S2 . . . . Similarly, addresses of centralized control stations related to this communication can be obtained.

Formats of the relay routing table for the service keys are illustrated hereinafter.

Relay routing table for the service keys for the centralized control station S (symbols such as S, S' and S1 are used instead of real network addresses herein)

| native address | destination address | address of next hop |
| --- | --- | --- |
| S | S | S |
| S | S1 | S1 |
| S | S2 | S1 |
| S | S' | S1 |
| ... | ... | ... |

Relay routing table for the service keys for the centralized control station S1 (symbols such as S, S' and S1 are used instead of real network addresses herein)

| local address | destination address | address of next hop |
| --- | --- | --- |
| S1 | S1 | S1 |
| S1 | S | S |
| S1 | S2 | S2 |
| S1 | S' | S2 |
| ... | ... | ... |

Each centralized control station has its relay routing table for the service keys, and the quantum network management server QM has all current relay routing tables for the service keys for centralized control stations in the network. The relay routing tables for the service keys are updated with changes of a topology of the quantum key distribution network.

It should be noted that, the contents of the table of binding relationship between centralized control stations and mobile terminals, the service information packet and the called-party response information packet mentioned in the above steps are just illustrative, for which there are a variety of specific implementations. For example, the communication service accounts of the mobile terminal are not necessarily uploaded to the quantum network management server, to form a part of the binding relationship between the centralized control stations and the mobile terminals; as long as both parties of the communication know each other's quantum identity numbers, and store each other's communication service accounts in the mobile terminals (e.g., an address book with the communication service accounts corresponding to the quantum identity numbers of the communicators may be stored in the mobile terminals), calling, handshaking, and determination of the addresses of the centralized control stations mentioned above can also be achieved if only the information packets uploaded by the mobile terminals include the quantum identity numbers of both parties of the communication. Thus, it only requires that the binding relationship described in Step2 has the following features.

<1> A mobile terminal which has already been registered to access the network has a unique quantum identity number in the quantum key distribution network;

<2> one mobile terminal cannot be bound to a plurality of centralized control stations during the same period;

<3> it is allowed to bind zero, one or more mobile terminals to one centralized control station during the same period;

<4> the binding relationship between the mobile terminal and the centralized control station is stored in the quantum network management server in the quantum key distribution network; and <5> the mobile terminal and the centralized control station bound to the mobile terminal share keys.

Figure 7:
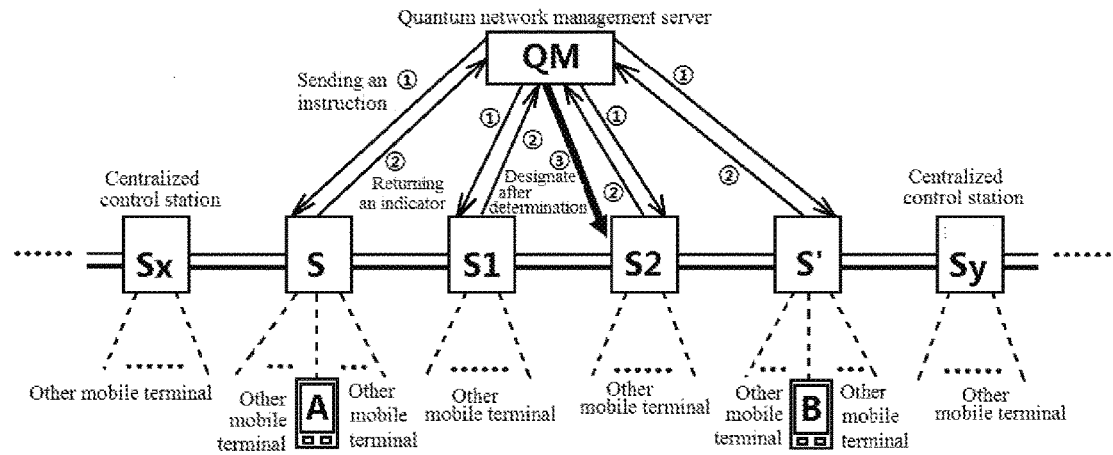
FIG. 7 is a diagram illustrating that a quantum network management server determines a centralized control station for service key generation during a communication.

In Step5, as shown in FIG. 7, the quantum network management server QM sends an instruction to the calling centralized control station S, the called centralized control station S', and the intermediate centralized control stations S1, S2, which are related to the communication, to command them to send the following state indicators to QM:

<1> an indicator reflecting a heavy state for service key generation tasks which the centralized control station is currently burdened with, wherein the indicator is a quantitative indicator and can be obtained based on some factors, such as:

(1) a rated service key generation rate of the centralized control station. Specific hardware models in respective centralized control stations may differ from each other, which makes their rated service key generation rates different, i.e., service key generation capabilities of respective centralized control stations may differ from each other. If a centralized control station has weak service key generation capability, it is not suitable to distribute too many service key generation tasks to the centralized control station.

(2) the number of groups of the secure communication services for which the centralized control station is currently generating service keys. If a centralized control station is currently generating service keys for many groups of communication services, it concludes to some extent that the centralized control station is currently busy and it is not suitable to distribute other service key generation tasks to the centralized control station.

(3) an amount of service keys to be generated currently by the centralized control station. If a centralized control station currently has a large amount of service keys to be generated, it concludes to some extent that the centralized control station currently has a heavy task. This indicator complements the indicator (2), and for different communication services, the amount of service keys required by a communication differs greatly (e.g., the amount of service keys required for encryption and decryption of short message is small, while the amount of service keys required for encryption and decryption of voice call or video call is large). Thus, if the amount of service keys to be generated is large, it concludes to some extent that the centralized control station has a heavy service key generation task.

(4) Actual generation rates and consumption rates of each group of service keys which are designated to be generated by the centralized control station. The consumption rates of some service keys are fast (such as video call), thus if a new service key generation task is to be assigned to a centralized control station, the generation rates for some service keys which are being generated and have fast consumption rates must be guaranteed without being influenced greatly. The actual generation rate of a group of service keys is a ratio of the amount of service keys generated recently in the group to time taken to generate the service keys (e.g., the last 10 seconds), and the consumption rate of service keys (the audio/video call is taken as example) is a fixed value obtained based on the service type and the coding/decoding format of the audio/video adopted in the service, which are provided in the service information packet. Generally, the actual generation rate of service keys is greater than the consumption rate. If the actual generation rate for a group of service keys which is being generated by a centralized control station is close to the consumption rate in a period, recently, or even beginning to be lower than the consumption rate, and the communication corresponding to the group of service keys still does not come to an end, it concludes that the group of service keys may face short-term supply tension. Thus it is not suitable to assign new service key generation task to the centralized control station.

(5) the amount of service keys which are generated and the amount of service keys which are consumed, for each group of service keys which are designated to be generated by the centralized control station. This indicator complements the indicator (4), and the consumption amount of service keys is a product of the consumption rate of service keys in indicator (4) times a period from the start of the communication service to present. If the generation amount of a group of service keys which are being generated by a centralized control station is close to the consumption amount, and the communication corresponding to the group of service keys still does not come to an end, it concludes that the group of service keys may be tense, thus it should be cautious to assign new service key generation task to the centralized control station.

<2> an indicator reflecting a current location state of the centralized control station in the quantum key distribution network, wherein the indicator is a quantitative indicator and can be obtained based on some factors, such as:

(1) the number of other centralized control stations with which the centralized control station shares quantum channels (shared keys may be generated). If a centralized control station is in the position of transport hub, the centralized control station may have a heavy task, its priority to take on the service key generation task may be set lower.

(2) the number of hops between the centralized control station and other centralized control stations. If a centralized control station is located near an intermediate position between the calling centralized control station and the called centralized control station in the communication link, that is, the difference between numbers of hops to the calling centralized control station and to the called centralized control station is small, the priority for the centralized control station to take on the service key generation task may be set higher, because the time from the start of transmission to the reception of the key by both recipients is the shortest when the key is transferred from an intermediate node to both sides.

<3> any combination of one or more items among the above seven state indicators.

The quantum network management server QM gathers the state indicators of centralized control stations to make a determination, to obtain an optimal centralized control station (e.g., S2 as shown in FIG. 7) in the link under the current condition, and uses S2 as the centralized control station for service key generation. Meanwhile, QM adds addresses of the calling centralized control station S and the called centralized control station S' in the communication into the received service information packet in Step4, makes a copy of the packet, designates the calling centralized control station S and the called centralized control station S' in the two packets as the target centralized control station for the key relay respectively, and sends the two service information packets to the centralized control station S2 for service key generation, to command S2 to generate the service keys key(A-B) required by the communication. The amount of the service keys depends on the service type provided in the service information packet (e.g., hundreds of bytes of service keys may be required to be distributed to an SMS ultra-long short message, while for an SIP call service, service keys required for the first distribution may be 1 MB or so, and service keys are continuously distributed to the mobile terminal in long calls. The amount of service keys required for a video call service may be even more).

Specially, if the communication is between two mobile terminals bound to the same centralized control station, e.g., communication between two mobile terminals bound to S2, S2 is both the calling centralized control station and the called centralized control station in this case. No relay centralized control station is required. Thus the choosing process for an optimal centralized control station can be omitted, and the centralized control station S2 is directly commanded to generate the service keys key(A-B) required by the communication.

Specially, in Step4, if the quantum network management server has already known that the called mobile terminal is not a mobile terminal accessing the network, since there is no legal called centralized control station in this case, the addresses of centralized control stations related to a key relay link in the communication cannot be determined. The processes of indicator collecting and determining described in Step5 are not performed, and the calling centralized control station in the communication is directly designated as the centralized control station for service key generation and generates the service keys of the communication for the calling mobile terminal.

Figure 8A:
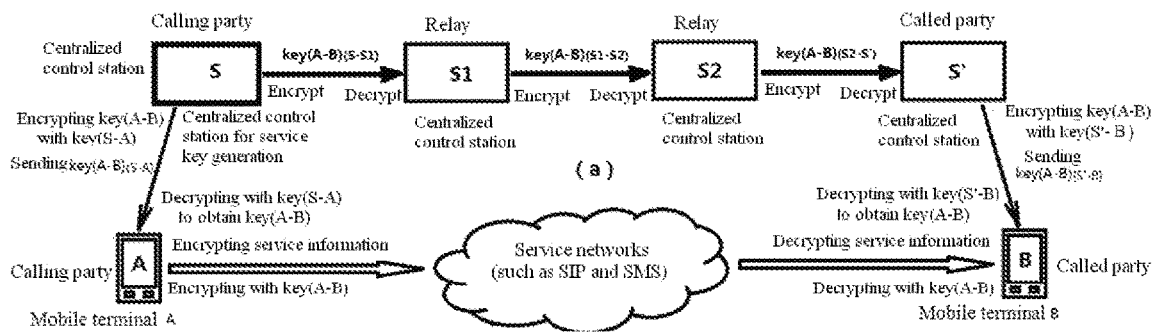
FIG. 8(a), FIG. 8(b), FIG. 8(c) and FIG. 8(d) are diagrams illustrating various possible distributions with key relay in the quantum key distribution network.

In Step6, after generating the service keys key(A-B) required by the communication, the centralized control station for service key generation performs the service key distribution based on the following four situations:

<1> as shown in FIG. 8(a), suppose the centralized control station for service key generation is the calling centralized control station S. After the two service information packets are read, the target centralized control station (the calling centralized control station S) for key relay which is described in one of the packets is known to be the centralized control station itself, and no relay is required.

Thus the service keys key(A-B) are directly encrypted through the keys key(S-A) shared between the centralized control station S and the calling mobile terminal A, and then the encrypted service keys key(A-B) are sent to the calling mobile terminal A through a wireless network channel. The target centralized control station (the called centralized control station S') for key relay which is described in the other packet is not the centralized control station itself, and the centralized control station S searches in the local relay routing table for the service keys to find the next hop centralized control station S1 leading to the called centralized control station S'. The service keys key(A-B) for the communication are encrypted through the keys key(S-S1) shared between the centralized control station S and the next hop centralized control station S1, and then the encrypted service keys key(A-B), along with the service information packet, are sent to the next hop centralized control station S1 through a wired network channel.

Figure 8B:
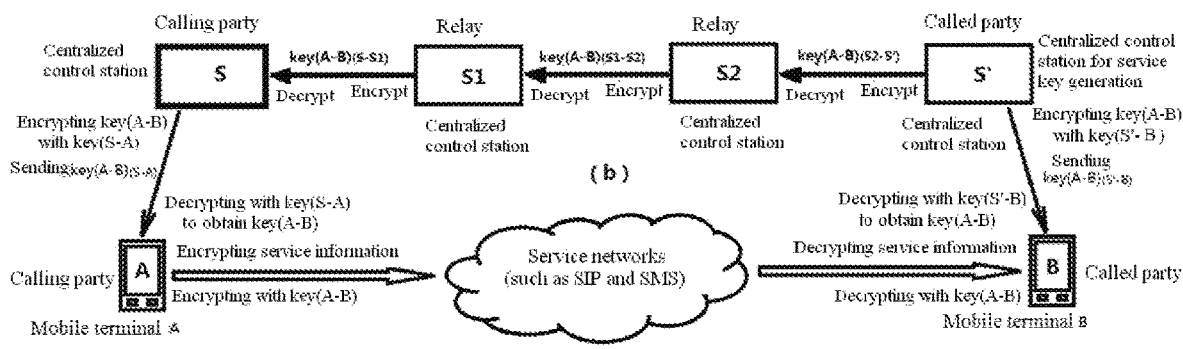

<2> as shown in FIG. 8(b), suppose the centralized control station for service key generation is the called centralized control station S'. After the two service information packets are read, the target centralized control station (the called centralized control station S') for key relay which is described in one of the packets is known to be the centralized control station itself, and no relay is required. Thus the service keys key(A-B) are directly encrypted through the keys key(S'-B) shared between the centralized control station S' and the called mobile terminal B, and then the encrypted service keys key(A-B) are sent to the called mobile terminal B. The target centralized control station (the calling centralized control station S) for key relay which is described in the other packet is not the centralized control station itself, the centralized control station S' searches in the local relay routing table for the service keys to find the next hop centralized control station S2 leading to the calling centralized control station S. The service keys key(A-B) for the communication are encrypted through the keys key(S2-S') shared between the centralized control station S' and the next hop centralized control station S2, and then the encrypted service keys key(A-B), along with the service information packet, are sent to the next hop centralized control station S2.

Figure 8C:
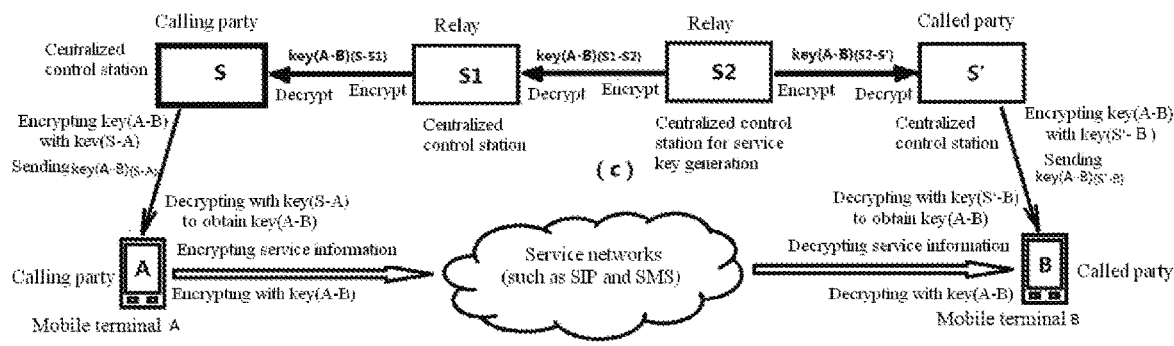

<3> as shown in FIG. 8(c), suppose the centralized control station for service key generation is neither the calling centralized control station nor the called centralized control station, but a relay centralized control station (e.g., the centralized control station S2 in FIG. 8(c)) between the calling centralized control station and the called centralized control station. After the two service information packets are read, the target centralized control stations (the calling centralized control station S and the called centralized control station S') for key relay which are described in the two packets are known not to be the centralized control station itself. S2 searches in the local relay routing table for the service keys to find the next hop centralized control station S1 leading to the calling centralized control station S. The service keys key(A-B) for the communication are encrypted through the keys key(S1-S2) shared between the centralized control station S2 and the next hop centralized control station S1, and then the encrypted service keys key(A-B), along with the service information packet using the calling centralized control station S as the target centralized control station, are sent to the next hop centralized control station S1. Meanwhile, S2 searches in the local relay routing table for the service keys, to find the next hop centralized control station S' leading to the called centralized control station S'. The service keys key(A-B) for the communication are encrypted through the keys key(S2-S') shared between the centralized control station S2 and the next hop centralized control station S', and then the encrypted service keys key(A-B), along with the service information packet using the called centralized control station S' as the target centralized control station, are sent to the next hop centralized control station S'.

Figure 8D:
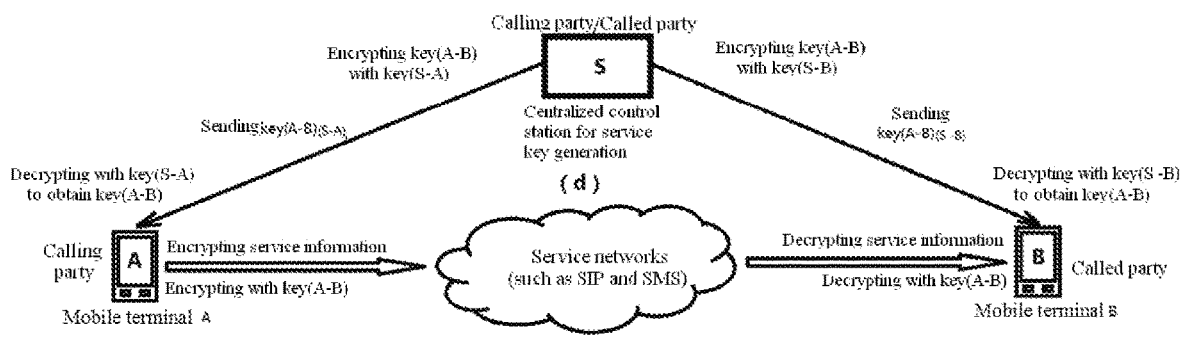

<4> as shown in FIG. 8(d), suppose the communication is between two mobile terminals A and B bound to the same centralized control station S. After the two service information packets are read, both of the target centralized control stations (the calling centralized control station S and the called centralized control station S') for key relay which are described in the two packets are known to be the centralized control station itself, and no relay is required. Thus the centralized control station S directly encrypts the service keys key(A-B) through the keys key(S-A) shared with the calling mobile terminal A, and then sends the encrypted service keys key(A-B) to the calling mobile terminal A. Meanwhile, the centralized control station S encrypts the service keys key(A-B) through the keys key(S-B) shared with the called mobile terminal B, and then sends the encrypted service keys key(A-B) to the called mobile terminal B.

After receiving the service keys and service information packet relayed from other centralized control stations, the centralized control station determines the address of the target centralized control station for this key relay provided in the service information packet. S' in FIG. 8(a) is taken as example, if the centralized control station itself is the target centralized control station for this key relay, after receiving and decrypting the encrypted service keys key(A-B)$_{(S2-S')}$, S' encrypts the decrypted service keys key(A-B) through the keys key(S'-B) shared with the mobile terminal B and sends the encrypted service keys key(A-B) to the mobile terminal B. S1 in FIG. 8(a) is taken as example, if the centralized control station itself is not the target centralized control station for this key relay, S1 searches in the relay routing table for the service keys stored in S1 locally to find the address of the next hop centralized control station S2 leading to the target centralized control station S'. After receiving and decrypting the encrypted service keys key(A-B)$_{(S-S1)}$, S1 encrypts the decrypted service keys key(A-B) through the keys key(S1-S2) shared with S2 and sends the encrypted service keys key(A-B) along with the service information packet to the next hop centralized control station S2.

The 'calling centralized control station', the 'called centralized control station', and the 'relay centralized control station', are not exclusive nature of a specific centralized control station. From the view of entire quantum key distribution network, all centralized control stations are the same, without function distinction like fixed 'calling', 'called', and 'relay'. In a specific communication service, the 'calling centralized control station', the 'called centralized control station', and the 'relay centralized control station' only make sense for this specific communication based on different centralized control stations bound to the mobile terminals of both communication parties. The role of the specific centralized control station in a specific communication is the calling centralized control station, while the role may be the called centralized control station or the relay centralized control station in another communication.

Figure 9A:
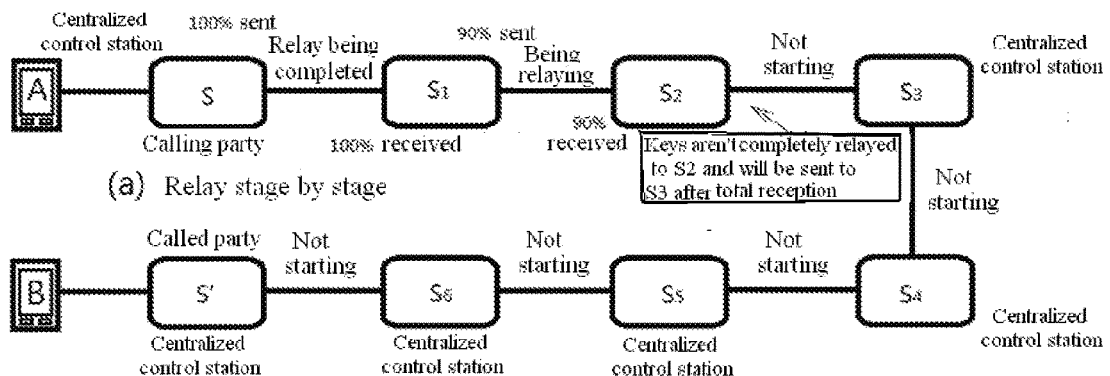
FIG. 9(a) and FIG. 9(b) are diagrams illustrating comparing two relay methods for transferring the service keys through multiple centralized control stations.
Figure 9B:
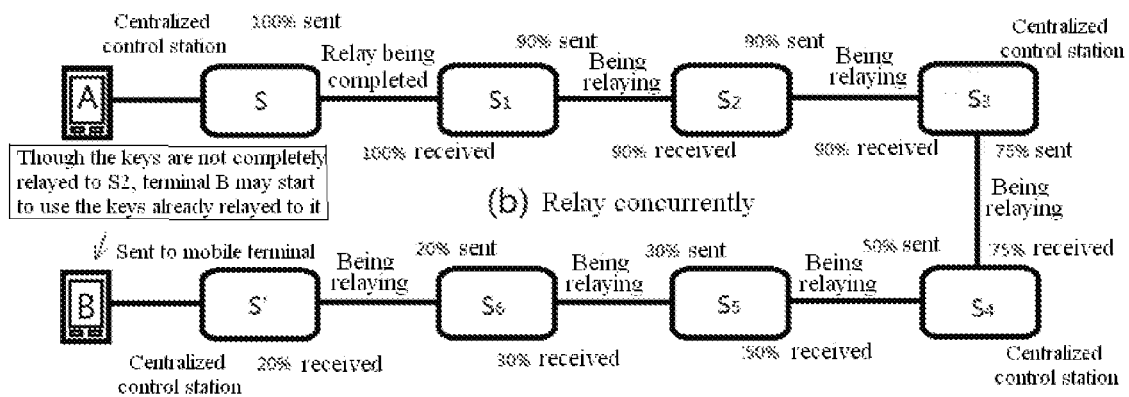

FIG. 9(a) and FIG. 9(b) are taken as examples. In the Step6, in the process of receiving the service keys relayed from a last hop centralized control station and then sending the service keys to the next hop centralized control station or a mobile terminal, instead of sending the service keys after completely receiving the service keys for the communication from the last hop centralized control station, the centralized control station starts the encryption and relay for the service keys at the beginning of receiving and decrypting a first frame data of the service keys (or a threshold may be set, and once the actual amount of decrypted service keys is greater than the threshold, the encryption and relay for the service keys is started). A dynamic upper limit of the amount of the service keys encrypted and relayed is the amount of service keys received and decrypted currently. During the same period, the service keys for the communication are actually in a state of concurrent relaying among a plurality of centralized control stations.

In Step7, after obtaining key(A-B)$_{(S-A)}$, the calling mobile terminal A decrypts key(A-B)$_{(S-A)}$ with the keys key(S-A) shared with the calling centralized control station S obtained in Step2, to obtain the service keys key(A-B) for the communication. Similarly, after obtaining key(A-B)$_{(S'-B)}$ sent from the called centralized control station S', the called mobile terminal B decrypts key(A-B)$_{(S'-B)}$ with the keys key(S'-B) shared with the called centralized control station S', to obtain the service keys key(A-B) for the communication.

In Step8, the mobile terminal A encrypts the service information with the service keys key(A-B), and sends the ciphertext to the mobile terminal B through an original data link of the communication service. The mobile terminal B obtains the encrypted service information, and decrypts the encrypted service information with the service keys key(A-B) obtained in Step7 to obtain the plaintext. The mobile terminal B can also send the service information to the mobile terminal A in this way, and the processes are similar.

Complementing for the Specific Implementation

1. In a real-time bidirectional interactive communication service (such as VOIP call), the mobile terminal can send and receive the service information simultaneously. In this case, each mobile terminal uses two threads, and applies to the quantum key distribution network for, and downloads, the service keys used to encrypt the service information sent from the terminal, and the service keys used to decrypt the service information ciphertext sent from a terminal on the opposite side. In a non-real-time non-bidirectional interactive communication service (such as SMS short message), each mobile terminal only needs to create one thread, to apply to the quantum key distribution network for the service keys, and the quantum key distribution network only needs to prepare one piece of service keys for the two mobile terminals.

2. In the quantum key distribution network, between the quantum terminal and the centralized control station to which the quantum terminal belongs, between the centralized control station and another centralized control station, and between the centralized control station and the quantum network management server, as long as both parties have quantum key generation devices and a shared quantum channel, the shared keys can be generated anytime for the use of secure communication between them.

In simplified variants of the applications of the quantum key distribution network with small scale or little requirement, each centralized control station and its affiliated quantum terminal, as shown in FIG. 4, can be combined in hardware and software, into a quantum key distribution device.

3. Due to different real-time requirements of different communication services, for services with high real-time requirements and high key consumption, such as SIP call and video call, if there are many relay nodes (as shown in FIG. 9(a)), a problem may occur in the voice call and video call, i.e., the ciphertext has already arrived at a destination through a service path, but the keys are still being encrypted and decrypted stage by stage, which causes failure to decrypt the ciphertext in time and communication delay.

In some services with high key consumption, to reduce the communication delay caused by the key relay process, the following methods may be used:

(1) When the various stages of centralized control stations mentioned above relay the keys, it is not allowed to start to send the keys (including encryption process) to the next hop centralized control station only when completely receiving the keys (including decryption process) from the last hop centralized control station. Almost at the same time when the centralized control station begins to receive the keys, it starts to send the keys to the next hop. The dynamic upper limit of the amount of the service keys sent is the amount of service keys received currently, that is, for a communication, the amount of service keys currently received by the centralized control station, is the maximum amount of service keys sent to the next hop centralized control station. In this case, during the same period, the service keys are actually in a state of pipeline of concurrent relaying among a plurality of centralized control stations, thus relay time is greatly saved. From the perspective of callers, the keys have already been starting to use before the transmission is completed, as shown in FIG. 9(a) and FIG. 9(b).

(2) When the service keys for the communication are consumed to a certain extent, the mobile terminal applies to the centralized control station bound to the mobile terminal for downloading keys again, and the process is similar to downloading keys for the first time. Before the original service keys are completely consumed, the new service keys have already been downloaded to the mobile terminal. Thus, from the perspective of callers, the process of waiting for downloading the new keys when the original keys are completely consumed is eliminated. When the subsequent downloading of keys is performed, the original keys have not been completely consumed, and the subsequent downloading of keys is performed during the communication. When the original keys are completely consumed, the new keys are available. Thus, time consumption for the subsequent downloading of keys does not cause actual communication delay.

4. For some services with high key consumption and a long duration (such as SIP call and video call), the service keys may be distributed for multiple times in a communication (the service keys obtained once from the distribution may be not enough). In each subsequent key distribution, the processes from Step3 to Step7, which are related to service key distribution, have to be performed again. For the mobile terminal, each process of applying for the keys is independent to each other, and is not related to each other, although these key downloading processes may correspond to the same secure communication. Similarly, each time the quantum network management server processes a service key application, a designated service key generation server may vary with real-time changes of environment of the quantum key distribution network, even if the service key applications correspond to the same communication.

5. The quantum network management server mainly has the following functions:

(1) storing, maintaining and querying the 'binding relationship' between centralized control stations and mobile terminals, and the 'relay routing table for the service keys';

(2) distributing a unique quantum identity number in the network to a mobile terminal which is newly registered to access the network;

(3) maintaining classic network connections to centralized control stations;

(4) determining legality of a mobile terminal based on received information associated with the mobile terminal;

(5) collecting current state indicators of centralized control stations participating in service key distribution, determining and designating the centralized control station for service key generation, and generating and sending new service information packets to the centralized control station;

(6) querying the addresses of centralized control stations located in a region where the mobile terminal is located, according to a geographic location of the mobile terminal; and (7) communicating with centralized control stations, and sending instructions to the centralized control stations.

6. In the specific implementation, modification of communication service details based on the technical solution still fall within the protection scope of the technical solution. For example, for non-real-time non-bidirectional interactive communication services such as SMS short message, the following changes may be made in the specific implementation.

(1) The calling mobile terminal applies to the quantum key distribution network for the service keys for the communication at first, and after the application, encrypts the short message, and sends the encrypted short message (ciphertext). After receiving the ciphertext, the called mobile terminal applies to the quantum key distribution network for the corresponding service keys, and then decrypts the ciphertext to obtain the short message. This process is slightly different from the process of the real-time bidirectional interactive service such as VOIP in that: the called mobile terminal needs to receive the encrypted short message sent from the opposite side at first, and then knowing it needs to apply to the quantum key distribution network for the service keys, which is premised on that the calling mobile terminal has sent the encrypted short message, i.e., the calling mobile terminal obtains the service keys before the called mobile terminal does. Thus, unlike the VoIP call where the quantum key distribution network distributes the service keys to the calling mobile terminal only after receiving the called-party response information packet sent from the called mobile terminal, the quantum key distribution network directly distributes the service keys to the calling mobile terminal based on the service information packet sent from the calling mobile terminal.

(2) Since few service keys are required for the short message service, and the time required for the called mobile terminal to receive the encrypted short message is greatly influenced by network conditions of telecom operators, the quantum key distribution network may directly designate, based on a simple rule, a centralized control station (e.g., generally it is the calling centralized control station based on a nearby principle) to take charge of the generation of service keys required for the communication, instead of based on the current state indicators of centralized control stations. The process of collecting the indicators is also removed meanwhile.

(3) After receiving the application for the service keys from the calling mobile terminal, the quantum key distribution network may command the centralized control station for service key generation to relay the service keys to the called centralized control station and distribute the service keys to the calling mobile terminal at the same time. In this way, when the called mobile terminal receives the encrypted short message, and applies to the quantum key distribution network for the service keys, the service keys may have already arrived at the called centralized control station (or already on the way of relay), then the called mobile terminal may directly download the service keys from the called centralized control station, thus the time waiting for the relay is saved.

(4) Due to characteristics of the non-real-time non-bidirectional interactive communication service (e.g., congestion in the network of telecom operators which may occur in the short message service), it may take a long time for the called mobile terminal to receive the encrypted short message. Thus the quantum key distribution network needs to keep the service key application information of the calling mobile terminal for a period, and does not perform the distribution until arrival of the called-party response information packet from the called mobile terminal, in order to distribute to the called mobile terminal the same service keys distributed to the calling mobile terminal. However, a threshold should be set for this period to avoid waiting indefinitely. Once this time threshold is exceeded, the quantum key distribution network may conclude that the short message transmission fails (i.e. the called mobile terminal does not receive the short message), and command to destroy the service keys generated for the communication without waiting any longer.

(5) Besides the description in (1)-(4), there may be other methods for distributing the service keys. For example, when short message communication is performed for the first time, both parties download large amounts of service keys, and the mobile terminals store the service keys for long-term use. These service keys may be used in the short message communication for both parties for several times, thus it needs not to download the service keys each time the short message is sent. That is, multiple non-real-time non-bidirectional interactive communications are regarded as a 'real-time bidirectional interactive' communication in a stretched period, based on which, the service keys are distributed. The method is suitable for the encryption and decryption of instant communication services or applications (such as QQ and MSN).

7. During a specific call, change and adjustment may be made on the above-described process of applying for keys by the mobile terminal. For example, after receiving a call request from the calling terminal, the called terminal obtains session keys first. The calling terminal obtains session keys after receiving a call answer. For example again, the called terminal does not need to apply to the quantum key distribution network for the service keys, but the quantum key distribution network searches for the called terminal and sends the service keys to the called terminal. For example again, there may be more times of handshaking between the calling mobile terminal and the called mobile terminal, or handshaking between the mobile terminal and the quantum key distribution network, to transmit more information. For example again, the calling terminal and the called terminal may obtain the service keys for the call from the quantum key distribution network before the call begins, then the calling terminal initiates the call to the called terminal, and the calling terminal and the called terminal use the obtained service keys to make the call. Various variants of the solution still fall in the protection scope of the application.

8. When the mobile terminal and the quantum key distribution network exchange information with each other, they may transmit some instructions with little requirement in confidentiality, via other conventional communication channels, such as Short Messaging Service (SMS) or WIFI, if it is allowed by the hardware.

9. In simplified variants of the applications of the quantum key distribution network with small scale or little requirement, the binding relationship between the mobile terminals and the centralized control stations is fixed so that constant one-to-one corresponding relation is established between the mobile terminals and the centralized control stations.

10. In simplified variants, the service information packet and the called-party response information packet may not include the accounts of the communication service. Instead, after receiving the information packets, the quantum key distribution network may search for the accounts of the communication service, such as VOIP, SMS or video call, based on the quantum identity numbers of the mobile terminals in the packets and the table of binding relationship between centralized control stations and mobile terminals maintained by the quantum key distribution network. Accordingly, workload of mobile terminals may be transferred to the quantum key distribution network, or workload of the quantum key distribution network may be transferred to the mobile terminals, which all fall in the protection scope of the application.

11. The authentication password in the table of binding relationship between centralized control stations and mobile terminals may include alphanumeric password input by the keyboard, password generated by digitizing biological information, such as voice or fingerprint, or digitized password stored in an encryption device (such as USB flash disk) which is connected to the mobile terminal before the communication.

12. In some variants, the quantum network management server QM may not send an instruction to the calling centralized control station, the called centralized control station, and the intermediate centralized control stations, which are related to secure communication, to command them to send the state indicators to QM. Instead the centralized control stations report their current states periodically to the QM. QM analyzes and compares the states reported by the centralized control stations and waits for the initiation of a new call. QM may designate the centralized control station for service key generation for the communication based on the reported states of the centralized control stations of the communication link of the call.

What is claimed is:

1. A mobile secure communication method based on a quantum key distribution network, comprising:
   (1) registering a plurality of mobile terminals to access the quantum key distribution network and obtain a unique quantum identity number for each of the plurality of mobile terminals;
   (2) establishing a table of binding relationship between each of the plurality of mobile terminals and a respective one of a plurality of centralized control stations in the quantum key distribution network and assigning sharing keys between each of the plurality of mobile terminals and its binding one of the plurality of centralized control stations in the quantum key distribution network;
   (3) after a communication is initiated, providing, by one of the plurality of mobile terminals, information related to the communication based on the table of binding relationship for the quantum key distribution network, to apply for service keys for the communication from the quantum key distribution network;
   (4) obtaining, by a quantum network management server of the quantum key distribution network, addresses of a calling centralized control station of the plurality of centralized control stations, a called centralized control station of the plurality of centralized control stations, and relay centralized control stations of the plurality of centralized control stations, by performing searching according to the information, wherein the relay centralized control stations participate in relaying the service keys for the communication, the calling centralized control station is bound with a calling mobile terminal, and the called centralized control station is bound with a called mobile terminal;
   (5) collecting, by the quantum network management server, current state indicators of the calling centralized control station, the called centralized control station, and the relay centralized control stations, determining an optimal service key generation centralized control station for the communication based on the collected current state indicators, sending a service information packet to the optimal service key generation centralized control station, and commanding the optimal service key generation centralized control station to generate the service keys for the communication;
   (6) generating and encrypting, by the service key generation centralized control station, the service keys for the communication, and distributing, by the service key generation centralized control station, the encrypted service keys to the calling mobile terminal and the called mobile terminal;
   (7) obtaining and decrypting, by the calling mobile terminal and the called mobile terminal, the encrypted service keys distributed by the service key generation centralized control station, wherein the calling mobile terminal and the called mobile terminal decrypt the encrypted service keys with the sharing keys, to obtain the service keys for the communication; and
   (8) performing, by the calling mobile terminal and the called mobile terminal, the communication with the service keys through an original data link of the communication.

2. The mobile secure communication method based on the quantum key distribution network according to claim 1, wherein the 'table of binding relationship' in the step (2) is characterized in that:
   (2-1) the table of binding relationship comprises [quantum identity numbers of the plurality of mobile terminals] [authentication password] [addresses of the binding centralized control stations] [service account identifiers];
   (2-2) the plurality of mobile terminals which have already been registered to access the quantum key distribution network have the unique quantum identity numbers in the quantum key distribution network;
   (2-3) the authentication password is configured to determine an identity when the one of the plurality of mobile terminals is connected to the quantum key distribution network;
   (2-4) the 'service account identifiers' are a collection of accounts of one or more different services supported by the one of the plurality of mobile terminals and the quantum key distribution network;
   (2-5) the one of the plurality of mobile terminals can only be bound to a single one of the plurality of centralized control stations during a same period;

(2-6) said single one of the plurality of centralized control stations is allowed to be bound to a further one of the plurality of mobile terminals during the same period;

(2-7) the table of binding relationship is stored in the quantum network management server in the quantum key distribution network; and (2-8) said one of the plurality of mobile terminals and said single one of the plurality of centralized control stations bound to said one of the plurality of mobile terminals have one of the sharing keys.

3. The mobile secure communication method based on the quantum key distribution network according to claim 2, wherein providing, by the one of the plurality of mobile terminals, information related to the communication based on the table of binding relationship for the quantum key distribution network in step (3) comprises: sending respectively, by the calling mobile terminal of the plurality of mobile terminals and the called mobile terminal of the plurality of mobile terminals, the service information packet and a called-party response information packet to the quantum network management server of the quantum key distribution network;

the service information packet is generated by the calling mobile terminal and comprises the quantum identity number and authentication information of the calling mobile terminal, a communication service account of the called mobile terminal, service type of the communication, and parameter information related to the communication; and the called-party response information packet is generated by the called mobile terminal and comprises a communication service account of the calling mobile terminal, the communication service account of the called mobile terminal, authentication information of the called mobile terminal, the service type of the communication, and the parameter information related to the communication.

4. The mobile secure communication method based on the quantum key distribution network according to claim 1, wherein obtaining, by the quantum network management server of the quantum key distribution network, addresses of the calling centralized control station, the called centralized control station and the relay centralized control stations comprises:

the quantum network management server obtaining the addresses of the calling centralized control station and the called centralized control station in the communication, based on received information related to the calling mobile terminal and the called mobile terminal and the table of binding relationship; and querying stored relay routing tables for the service keys, and obtaining the addresses of the relay centralized control stations between the calling centralized control station and the called centralized control station in the communication.

5. The mobile secure communication method based on the quantum key distribution network according to claim 3, wherein determining the optimal service key generation centralized control station for the communication, and commanding the optimal service key generation centralized control station to generate the service keys for the communication in the step (5) comprises:

(5-1) the quantum network management server sending an instruction to the calling centralized control station, the called centralized control station, and the relay centralized control stations between the calling centralized control station and the called centralized control station, to command the calling centralized control station, the called centralized control station, and the relay centralized control stations to upload the current state indicators to the quantum network management server;

(5-2) the quantum network management server collecting the current state indicators, and determining the optimal service key generation centralized control station in the communication based on the current state indicators; and (5-3) the quantum network management server adding the addresses of the calling centralized control station and the called centralized control station in the communication into the service information packet sent from the calling mobile terminal, making a copy of the service information packet to form two service information packets, designating, in the two service information packets, the calling centralized control station and the called centralized control station as target centralized control stations respectively, and sending the two service information packets to the optimal service key generation centralized control station, to command the optimal service key generation centralized control station to generate the service keys for the communication.

6. The mobile secure communication method based on the quantum key distribution network according to claim 5, wherein distributing, by the service key generation centralized control station, the encrypted service keys to the calling mobile terminal and the called mobile terminal in the step (6) comprises:

(6-1) the service key generation centralized control station respectively analyzing content of the two service information packets sent by the quantum network management server, if one of the target centralized control stations designated in one of the two service information packets is not the service key generation centralized control station, searching in a relay routing table for the service keys for a next hop centralized control station leading to the one of the target centralized control stations, encrypting the service keys for the communication with first keys shared between the service key generation centralized control station and the next hop centralized control station, and then sending the encrypted service keys along with the one of the two service information packets to the next hop centralized control station; and (6-2) after receiving the encrypted service keys and the one of the two service information packets relayed from a last hop centralized control station, the next hop centralized control station decrypting the received service keys with the first keys shared between the last hop centralized control station and the next hop centralized control station, analyzing content of the one of the two service information packets, if the one of the target centralized control stations designated in the one of the two service information packets is the next hop centralized control station, encrypting the service keys with the sharing keys shared between the next hop centralized control station and the calling mobile terminal or the called mobile terminal, and then sending the encrypted service keys to the calling mobile terminal or the called mobile terminal; if the one of the target centralized control stations designated in the one of the two service information packets is not the next hop centralized control station, searching for a further next hop centralized control station leading to the one of the target centralized control stations, encrypting the service keys for the communication with second keys shared between the next hop centralized control station and the further next hop centralized control station, and then sending the encrypted service keys along with the one of the two service information packets to the further next hop centralized control station.

7. The mobile secure communication method based on the quantum key distribution network according to claim 6, wherein the next hop centralized control station starts encrypting and forwarding the service keys at the beginning of receiving and decrypting a first frame data of the service keys, rather than after completely receiving the service keys for the communication from the last hop centralized control station; or
a threshold is set, and once an amount of the decrypted service keys is greater than the threshold, the next hop centralized control station starts encrypting and forwarding the service keys; a dynamic upper limit of the amount of the encrypted and forwarded service keys is the amount of the service keys received and decrypted currently; and during a same period, the service keys for the communication are in a state of concurrent relaying among the relay centralized control stations.

8. The mobile secure communication method based on the quantum key distribution network according to claim 4, wherein the 'relay routing tables for the service keys' are characterized by:
(8-1) each of the relay routing tables for the service keys consists of records, and each record comprises: a local station address, a target address, and a next hop address;
(8-2) each of the plurality of centralized control stations in the quantum key distribution network stores a respective one of the relay routing tables;
(8-3) the quantum network management server stores the relay routing tables; and
(8-4) the relay routing tables for the service keys are updated with changes of a topology of the quantum key distribution network.

9. The mobile secure communication method based on the quantum key distribution network according to claim 1, wherein:
(9-1) the current state indicators reflect a heavy state for service key generation tasks which each of the calling centralized control station, the called centralized control station, and the relay centralized control stations is currently burdened with, wherein each of the current state indicators is a quantitative indicator and comprises:
(9-1-1) a rated service key generation rate of each of the calling centralized control station, the called centralized control station, and the relay centralized control stations;
(9-1-2) a number of groups of secure communication services for which each of the calling centralized control station, the called centralized control station, and the relay centralized control stations is currently generating the service keys;
(9-1-3) an amount of the service keys to be generated currently by each of the calling centralized control station, the called centralized control station, and the relay centralized control stations;
(9-1-4) an actual generation rate and a consumption rate of the service keys which are designated to be generated by each of the calling centralized control station,
the called centralized control station, and the relay centralized control stations; or
(9-1-5) a generation amount and a consumption amount of the service keys which are designated to be generated by each of the calling centralized control station, the called centralized control station, and the relay centralized control stations; or
(9-2) the current state indicators reflect a current location state of each of the calling centralized control station, the called centralized control station, and the relay centralized control stations in the quantum key distribution network, wherein each of the current state indicators is a quantitative indicator and comprises:
(9-2-1) a number of quantum channels between the calling centralized control station, the called centralized control station, the relay centralized control stations and others of the plurality of centralized control stations; or
(9-2-2) a number of hops between the calling centralized control station, the called centralized control station, the relay centralized control stations and others of the plurality of centralized control stations.

10. The mobile secure communication method based on the quantum key distribution network according to claim 1, wherein main functions of the quantum network management server comprise:
(10-1) storing, maintaining and querying the 'table of binding relationship' and 'relay routing tables for the service keys';
(10-2) distributing the unique quantum identity numbers in the quantum key distribution network to the plurality of mobile terminals;
(10-3) maintaining classic network connections to the plurality of centralized control stations;
(10-4) determining legality of each of the plurality of mobile terminals based on received information associated with the plurality of mobile terminals;
(10-5) collecting the current state indicators of the calling centralized control station, the called centralized control station, and the relay centralized control stations, determining and designating the service key generation centralized control station, and generating and sending a new service information packet to the service key generation centralized control station;
(10-6) querying addresses of ones of the plurality of centralized control stations located in a region where one of the plurality of mobile terminals is located, according to a geographic location of said one of the plurality of mobile terminals; and
(10-7) communicating with the plurality of centralized control stations, and sending instructions to the plurality of centralized control stations.

11. The mobile secure communication method based on the quantum key distribution network according to claim 3, wherein the quantum key distribution network distributes the service keys for a non-real-time non-bidirectional interactive communication service, and wherein:
(11-1) after receiving an application for the service keys from the calling mobile terminal, the quantum key distribution network directly designates the service key generation centralized control station for the communication instead of collecting the current state indicators, commands the service key generation centralized control station to generate the service keys for the communication, distributes the service keys to the calling mobile terminal, and relays the service keys to the called centralized control station; and the calling mobile terminal encrypts plaintext with the service keys to obtain ciphertext and sends the ciphertext to the called mobile terminal, and the called mobile terminal applies to the quantum key distribution network for the service keys and downloads the service keys from the called centralized control station after receiving the ciphertext; and (11-2) the quantum key distribution network retains the service information packet sent from the calling mobile terminal for a period of time, matches the service information packet with the called-party response information packet sent from the called mobile terminal, in order to distribute to the called mobile terminal the service keys which are the same as the ones distributed to the calling mobile terminal; and a threshold time is set for the period, and if the called-party response information packet is not received when the threshold time is reached, the quantum key distribution network destroys the service keys generated for the communication.

12. The mobile secure communication method based on the quantum key distribution network according to claim 1, wherein when a geographic location of one of the plurality of mobile terminals changes:

(12-1) the one of the plurality of mobile terminals is bound with a new one of the plurality of centralized control stations currently located in a region where the one of the plurality of mobile terminals is located; and (12-2) the sharing keys shared between the one of the plurality of mobile terminals and an original centralized control station bound to the one of the plurality of mobile terminals are transferred to the new one of the plurality of centralized control stations after being encrypted, and the new one of the plurality of centralized control stations shares the sharing keys with the one of the plurality of mobile terminals after decrypting the keys.

13. The mobile secure communication method based on the quantum key distribution network according to claim 6, wherein the 'relay routing tables for the service keys' are characterized by:

(13-1) each of the relay routing tables for the service keys consists of records, and each record comprises: a local station address, a target address, and a next hop address;

(13-2) each of the plurality of centralized control stations in the quantum key distribution network stores a respective one of the relay routing tables;

(13-3) the quantum network management server stores the relay routing tables; and (13-4) the relay routing tables for the service keys are updated with changes of a topology of the quantum key distribution network.

14. The mobile secure communication method based on the quantum key distribution network according to claim 5, wherein:

(14-1) the current state indicators reflect a heavy state for service key generation tasks which each of the calling centralized control station, the called centralized control station, and the relay centralized control stations is currently burdened with, wherein each of the current state indicators is a quantitative indicator and comprises:

(14-1-1) a rated service key generation rate of each of the calling centralized control station, the called centralized control station, and the relay centralized control stations;

(14-1-2) a number of groups of secure communication services for which each of the calling centralized control station, the called centralized control station, and the relay centralized control stations is currently generating the service keys;

(14-1-3) an amount of the service keys to be generated currently by each of the calling centralized control station, the called centralized control station, and the relay centralized control stations;

(14-1-4) an actual generation rate and a consumption rate of the service keys which are designated to be generated by each of the calling centralized control station, the called centralized control station, and the relay centralized control stations; or (14-1-5) a generation amount and a consumption amount of the service keys which are designated to be generated by each of the calling centralized control station, the called centralized control station, and the relay centralized control stations; or (14-2) the current state indicators reflect a current location state of each of the calling centralized control station, the called centralized control station, and the relay centralized control stations in the quantum key distribution network, wherein each of the current state indicators is a quantitative indicator and comprises:

(14-2-1) a number of quantum channels between the calling centralized control station, the called centralized control station, the relay centralized control stations and others of the plurality of centralized control stations; or (14-2-2) a number of hops between the calling centralized control station, the called centralized control station, the relay centralized control stations and others of the plurality of centralized control stations.

15. The mobile secure communication method based on the quantum key distribution network according to claim 2, wherein when a geographic location of one of the plurality of mobile terminals changes:

(15-1) the one of the plurality of mobile terminals is bound with a new one of the plurality of centralized control stations currently located in a region where the one of the plurality of mobile terminals is located; and (15-2) the sharing keys shared between the one of the plurality of mobile terminals and an original centralized control station bound to the one of the plurality of mobile terminals are transferred to the new one of the plurality of centralized control stations after being encrypted, and the new one of the plurality of centralized control stations shares the sharing keys with the one of the plurality of mobile terminals after decrypting the keys.

16. The mobile secure communication method based on the quantum key distribution network according to claim 2, wherein main functions of the quantum network management server comprise:

(16-1) storing, maintaining and querying the 'table of binding relationship', and 'relay routing tables for the service keys';

(16-2) distributing the unique quantum identity numbers in the quantum key distribution network to the plurality of mobile terminals;

(16-3) maintaining classic network connections to the plurality of centralized control stations;

(16-4) determining legality of each of the plurality of mobile terminals based on received information associated with the plurality of mobile terminals;

(16-5) collecting the current state indicators of the calling centralized control station, the called centralized control station, and the relay centralized control stations, determining and designating the service key generation centralized control station, and generating and sending a new service information packet to the service key generation centralized control station;

(16-6) querying addresses of ones of the plurality of centralized control stations located in a region where one of the plurality of mobile terminals is located, according to a geographic location of said one of the plurality of mobile terminals; and (16-7) communicating with the plurality of centralized control stations, and sending instructions to the plurality of centralized control stations.

17. The mobile secure communication method based on the quantum key distribution network according to claim 3, wherein main functions of the quantum network management server comprise:

(17-1) storing, maintaining and querying the 'table of binding relationship', and 'relay routing tables for the service keys';

(17-2) distributing the unique quantum identity numbers in the quantum key distribution network to the plurality of mobile terminals;

(17-3) maintaining classic network connections to the plurality of centralized control stations;

(17-4) determining legality of each of the plurality of mobile terminals based on received information associated with the plurality of mobile terminals;

(17-5) collecting the current state indicators of the calling centralized control station, the called centralized control station, and the relay centralized control stations, determining and designating the service key generation centralized control station, and generating and sending a new service information packet to the service key generation centralized control station;

(17-6) querying addresses of ones of the plurality of centralized control stations located in a region where one of the plurality of mobile terminals is located, according to a geographic location of said one of the plurality of mobile terminals; and (17-7) communicating with the plurality of centralized control stations, and sending instructions to the plurality of centralized control stations.

18. The mobile secure communication method based on the quantum key distribution network according to claim 4, wherein main functions of the quantum network management server comprise:

(18-1) storing, maintaining and querying the 'table of binding relationship', and 'relay routing tables for the service keys';

(18-2) distributing the unique quantum identity numbers in the quantum key distribution network to the plurality of mobile terminals;

(18-3) maintaining classic network connections to the plurality of centralized control stations;

(18-4) determining legality of each of the plurality of mobile terminals based on received information associated with the plurality of mobile terminals;

(18-5) collecting the current state indicators of the calling centralized control station, the called centralized control station, and the relay centralized control stations, determining and designating the service key generation centralized control station, and generating and sending a new service information packet to the service key generation centralized control station;

(18-6) querying addresses of ones of the plurality of centralized control stations located in a region where one of the plurality of mobile terminals is located, according to a geographic location of said one of the plurality of mobile terminals; and (18-7) communicating with the plurality of centralized control stations, and sending instructions to the plurality of centralized control stations.

19. The mobile secure communication method based on the quantum key distribution network according to claim 5, wherein main functions of the quantum network management server comprise:

(19-1) storing, maintaining and querying the 'table of binding relationship', and 'relay routing tables for the service keys';

(19-2) distributing the unique quantum identity numbers in the quantum key distribution network to the plurality of mobile terminals;

(19-3) maintaining classic network connections to the plurality of centralized control stations;

(19-4) determining legality of each of the plurality of mobile terminals based on received information associated with the plurality of mobile terminals;

(19-5) collecting the current state indicators of the calling centralized control station, the called centralized control station, and the relay centralized control stations, determining and designating the service key generation centralized control station, and generating and sending a new service information packet to the service key generation centralized control station;

(19-6) querying addresses of ones of the plurality of centralized control stations located in a region where one of the plurality of mobile terminals is located, according to a geographic location of said one of the plurality of mobile terminals; and (19-7) communicating with the plurality of centralized control stations, and sending instructions to the plurality of centralized control stations.

20. The mobile secure communication method based on the quantum key distribution network according to claim 5, wherein distributing, by the service key generation centralized control station, the encrypted service keys to the calling mobile terminal and the called mobile terminal in the step (6) comprises:

the service key generation centralized control station respectively analyzing content of the two service information packets sent by the quantum network management server, if one of the target centralized control stations designated in one of the two service information packets is the service key generation centralized control station, encrypting the service keys with the sharing keys shared between the service key generation centralized control station and the calling mobile terminal or the called mobile terminal, and then sending the encrypted service keys to the calling mobile terminal or the called mobile terminal.

* * * * *